(12) United States Patent
Toyama et al.

(10) Patent No.: US 9,325,745 B2
(45) Date of Patent: Apr. 26, 2016

(54) PROVIDING SERVICES BY MANAGING COMMUNICATION RELATIONSHIPS

(75) Inventors: Masashi Toyama, Musashino (JP); Koji Murakami, Musashino (JP); Yoshiko Sueda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 13/123,133

(22) PCT Filed: Oct. 16, 2009

(86) PCT No.: PCT/JP2009/067937
§ 371 (c)(1),
(2), (4) Date: Apr. 7, 2011

(87) PCT Pub. No.: WO2010/044471
PCT Pub. Date: Apr. 22, 2010

(65) Prior Publication Data
US 2011/0196978 A1      Aug. 11, 2011

(30) Foreign Application Priority Data

Oct. 17, 2008   (JP) ................. 2008-269136

(51) Int. Cl.
*G06F 15/16* (2006.01)
*H04L 29/06* (2006.01)
(Continued)

(52) U.S. Cl.
CPC ............ *H04L 65/1069* (2013.01); *G06Q 30/06* (2013.01); *H04L 65/4023* (2013.01); *H04L 67/02* (2013.01); *H04L 67/22* (2013.01); *H04L 65/1006* (2013.01)

(58) Field of Classification Search
None
See application file for complete search history.

(56) References Cited

U.S. PATENT DOCUMENTS

| | | | | |
|---|---|---|---|---|
| 7,412,598 B1 * | 8/2008 | Gleichauf | ........... | H04L 63/0807 379/243 |
| 7,729,480 B1 * | 6/2010 | Packingham | ........... | H04W 4/00 370/352 |

(Continued)

FOREIGN PATENT DOCUMENTS

| | | |
|---|---|---|
| CN | 100385884 C | 4/2008 |
| CN | 101174968 A | 5/2008 |

(Continued)

OTHER PUBLICATIONS

Chinese Office Action Issued Jul. 3, 2012 in Patent Application No. 200980139758.0.

(Continued)

*Primary Examiner* — Joshua Joo
*Assistant Examiner* — Younes Naji
(74) *Attorney, Agent, or Firm* — Oblon, McClelland, Maier & Neustadt, L.L.P.

(57) ABSTRACT

A service providing server collects call session information that identifies communication established between terminals and service usage IDs that identify the terminals for each terminal. Then, the service providing server identifies call session information pieces indicating the same communication and associates Web services with each other. When the service providing server provides the associated Web services to the terminals, the service providing server identifies service usage IDs that identify the terminals and control provision of the Web services so that each Web service is provided according to history information stored in a history information database in association with service usage IDs.

16 Claims, 25 Drawing Sheets

(51) Int. Cl.
*G06Q 30/06* (2012.01)
*H04L 29/08* (2006.01)

(56) References Cited

U.S. PATENT DOCUMENTS

| | | | | |
|---|---|---|---|---|
| 7,912,046 | B2* | 3/2011 | Li | H04L 29/12009 370/389 |
| RE42,883 | E | 11/2011 | Korycki et al. | |
| 2004/0119814 | A1* | 6/2004 | Clisham | H04N 7/141 348/14.08 |
| 2005/0008000 | A1* | 1/2005 | Korycki | H04L 12/66 370/352 |
| 2005/0154784 | A1 | 7/2005 | Malcolm et al. | |
| 2005/0165719 | A1* | 7/2005 | Greenspan | H04L 29/06027 |
| 2006/0010236 | A1* | 1/2006 | Meiser | H04L 67/20 709/226 |
| 2008/0253545 | A1 | 10/2008 | Gleichauf | |

FOREIGN PATENT DOCUMENTS

| | | |
|---|---|---|
| CN | 100407709 C | 7/2008 |
| JP | 2003 44429 | 2/2003 |
| JP | 2005 228122 | 8/2005 |
| JP | 2006-209554 A | 8/2006 |
| JP | 2007-233862 | 9/2007 |
| JP | 2008-210010 | 9/2008 |

OTHER PUBLICATIONS

International Search Report issued Jan. 12, 2010 in PCT/JP09/67937 filed Oct. 16, 2009.
Sueda, Yoshiko et al., "R&D Hot Corner Solution 'Denwa de Link'-Tsuwa to Web no Renkel Communication", NTT Gijutsu Journal, vol. 20, No. 5, pp. 48 to 51, (Jun. 1, 2008), (with partial English translation).
Toyama, Masashi et al., "A Security Methods for Session Federated Services base on SIP", IEICE Technical Report, vol. 107, No. 525, pp. 49 to 54, ISSN: 0913-5685, (Feb. 28, 2008), (with partial English translation).
Sueda, Yoshiko et al., "A Study of Methods for Session Federated Services based on SIP", IEICE Technical Report, vol. 107, No. 483, ISSN: 0913-5685, (Feb. 7, 2008), (with partial English translation).
Extended European Search Report issued Jun. 22, 2012, in European Patent Application No. 09820649.3.
Murakami Koji, et al., "A Session Linkage Enabler based on SIP Authentication and its Service", 12th International Conference on Intelligent Service Delivery Networks, XP-55029097, Oct. 20-23, 2008, 6 pages.
Office Action issued Nov. 27, 2012 in Japanese Patent Application No. 2010-533940 (with English-language translation).
Office Action issued Sep. 4, 2012 in Japnese Application No. 2010-533940 (With English Translation).

* cited by examiner

FIG.4

| Call-ID | From | To | call SESSION INFORMATION |
|---|---|---|---|
| : | : | : | : |
| : | : | : | : |
| 100 | 0422591111@idp.com | 0422593333@idp.com | e8b03879d0f5629aa8b5ea6a06736cle |
| : | : | : | : |
| : | : | : | : |

FIG.5

| SIP-URI | SERVICE PROVIDING SERVER URI | SERVICE USAGE ID |
|---|---|---|
| : | : | : |
| : | : | : |
| 0422591111@idp.com | web1.sp1.com | USER1-web1-SP-id |
| 0422591111@idp.com | web2.sp2.com | USER1-web2-SP-id |
| 0422592222@idp.com | web2.sp2.com | USER2-web2-SP-id |
| 0422593333@idp.com | web1.sp1.com | USER3-web1-SP-id |
| : | : | : |
| : | : | : |

FIG.6

```
<Assertion ID=" a75adf55-01d7-40cc-929f-dbd8372ebdfc"  IssueInstant="2003-04-17T00:46:02Z"
     Version="2.0"
  xmlns="urn:oasis:names:tc:SAML:2.0:assertion">
  <Issuer> idp.example.com</Issuer>
  <Subject>
    <NameID Format=" urn:oasis:names:tc:SAML:2.0:attrname-format:uri "> [SERVICE USAGE ID]
    USER1-web1-SP-id
    </NameID>
    <SubjectConfirmation  Method="urn:oasis:names:tc:SAML:2.0:cm:sender-vouches"/>
  </Subject>
  <AttributeStatement>
    <saml:Attribute>
      <saml:AttributeValue xsi:type="saml:ntt:pf:web:session-id"> [call SESSION INFORMATION]
      e8b03879d0f5629aa8b5ea6a06736cle
      </saml:AttributeValue>
    </saml:Attribute>
  </AttributeStatement>
  (SIGNATURE IS OMITTED)
</Assertion>
```

FIG.7

```
<ds:Signature xmlns:ds="http://www.w3.org/2000/09/xmldsig#">
    <ds:SignedInfo>
        <ds:CaNOnicalizationMethod Algorithm="http://www.w3.org/2001/10/xml-exc-c14n#"/>
        <ds:SignatureMethod Algorithm="http://www.w3.org/2000/09/xmldsig#rsa-sha1"/>
        <ds:Reference URI="#_a75adf55-01d7-40cc-929f-dbd8372ebdfc">
            <ds:Transforms>
                <ds:Transform Algorithm="http://www.w3.org/2000/09/xmldsig#enveloped-signature"/>
                <ds:Transform Algorithm="http://www.w3.org/2001/10/xml-exc-c14n#">
                    <InclusiveNamespaces   PrefixList="#default saml ds xs xsi"
                    xmlns="http://www.w3.org/2001/10/xml-exc-c14n#"/>
                </ds:Transform>
            </ds:Transforms>
            <ds:DigestMethod Algorithm="http://www.w3.org/2000/09/xmldsig#sha1"/>
            <ds:DigestValue>
            Kclet6XcaOgOWXM4gty6/UNdvil=
            </ds:DigestValue>
        </ds:Reference>
    </ds:SignedInfo>
    <ds:SignatureValue>
    hq4zk+ZkniggCQgZm7ea8fI7...Hr7wHxvCCRwubnmlfZ6RqVL+wNmeWl4=        ← SIGNATURE DATA
    </ds:SignatureValue>
    <ds:KeyInfo>
        <ds:X509Data>
            <ds:X509Certificate>
            MIICyjCCAjOgAwIBAgICAnUwDQYJKoZIhvcNAQEEBQAwgakxCzAJBgNVBAYTAIVT
            MRIwEAYDVQQIEwIXaXNjb......dnP6Hr7wHxvCCRwubnmlfZ6QZAv2FU78pLX       ← PUBLIC KEY INFORMATION
            8l3bsbmRAUg4UP9hH6ABVq4KQKMknxu1xQxLhpR1ylGPdiowMNTrEG8cCx3w/w==
            </ds:X509Certificate>
        </ds:X509Data>
    </ds:KeyInfo>
</ds:Signature>
```

| call SESSION INFORMATION | SERVICE USAGE ID | Web SESSION INFORMATION |
|---|---|---|
| : | : | : |
| : | : | : |
| e8b03879d0f5629aa8b5ea6a06736cle | USER1-web1-SP-id | 123 |
| e8b03879d0f5629aa8b5ea6a06736cle | USER3-web1-SP-id | 456 |
| : | : | : |
| : | : | : |

FIG.10

| STORE ID | NAME | ADDRESS | CATEGORY |
|---|---|---|---|
| : | : | : | : |
| : | : | : | : |
| 20001 | ○○ SHOP | ···, TACHIKAWA CITY, TOKYO | CHINESE FOOD |
| 20002 | ×× STORE | ···, SHINJUKU WARD, TOKYO | JAPANESE FOOD |
| 20003 | aa SHOP | ···, SHINAGAWA WARD, TOKYO | WESTERN FOOD |
| 20004 | bb STORE | ···, CHIYODA WARD, TOKYO | CHINESE FOOD |
| 20005 | cc SHOP | ···, MITAKA CITY, TOKYO | JAPANESE FOOD |
| 20006 | dd STORE | ···, MUSASHINO CITY, TOKYO | JAPANESE FOOD |
| : | : | : | : |
| : | : | : | : |

FIG.11

| SERVICE USAGE ID | STORE ID | STATUS |
|---|---|---|
| : | : | : |
| : | : | : |
| USER1-web1-SP-id | 20001 | BROWSING ONLY |
| USER1-web1-SP-id | 20002 | USED |
| USER1-web1-SP-id | 20005 | USED |
| USER3-web1-SP-id | 20002 | USED |
| USER3-web1-SP-id | 20004 | USED |
| : | : | : |
| : | : | : |

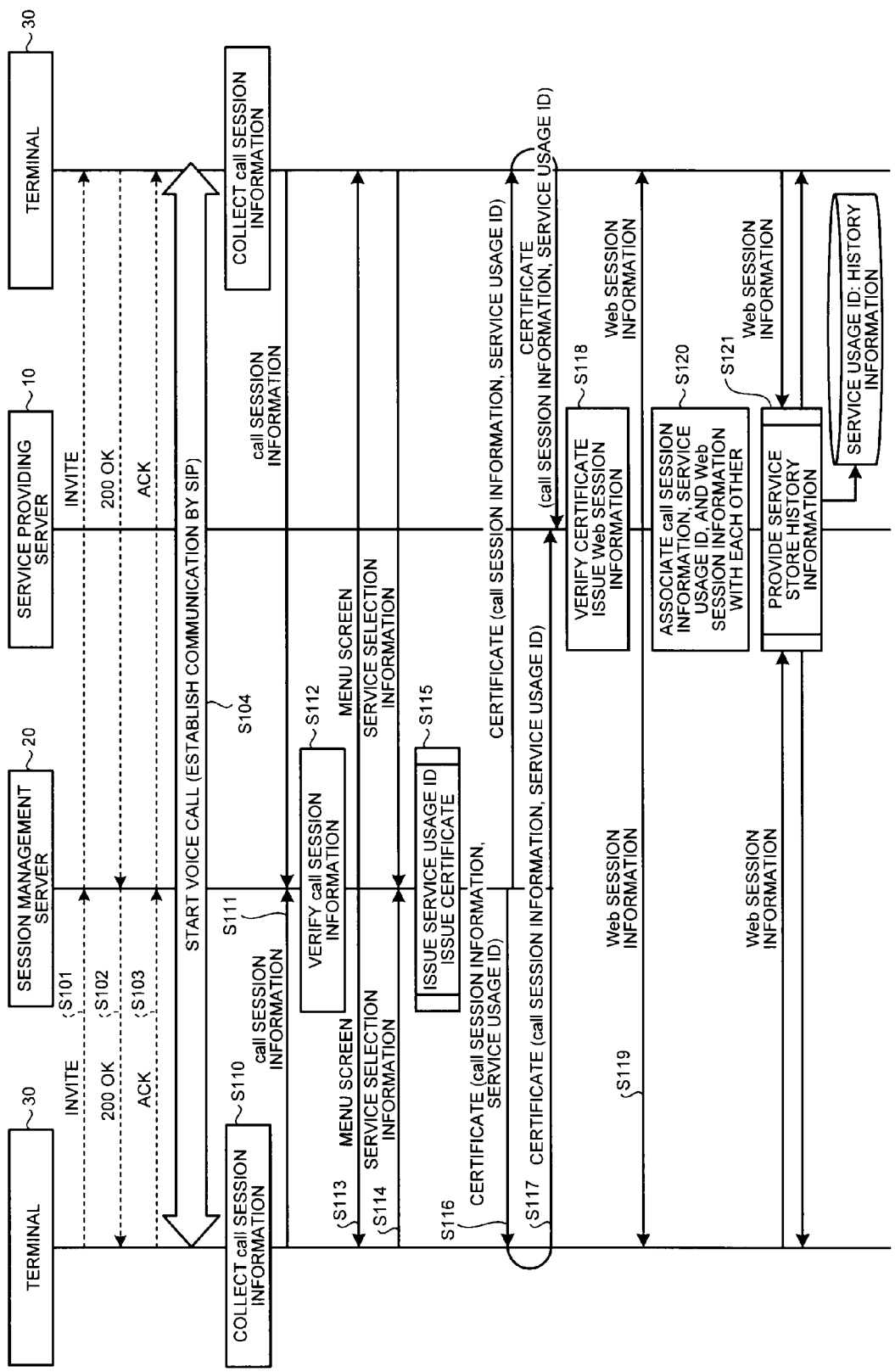

| USER ID | PASS-WORD | NAME | ADDRESS | SEX | SERVICE USAGE ID |
|---|---|---|---|---|---|
| : | : | : | : | : | : |
| : | : | : | : | : | : |
| myuser@web1.sp1.com | 1234 | PATENT TARO | ···, MUSASHINO CITY, TOKYO | MALE | USER1-web1-SP-id |
| ouruser@web1.sp1.com | 2234 | PATENT HANAKO | ···, CHIYODA WARD, TOKYO | FEMALE | USER3-web1-SP-id |
| : | : | : | : | : | : |
| : | : | : | : | : | : |

| SIP-URI | SERVICE PROVIDING SERVER URI | SERVICE USAGE ID | USER ID |
|---|---|---|---|
| ⋮ | ⋮ | ⋮ | ⋮ |
| ⋮ | ⋮ | ⋮ | ⋮ |
| 0422591111@idp.com | web1.sp1.com | USER1-web1-SP-id | myuser@web1.sp1.com |
| 0422591111@idp.com | web2.sp2.com | USER1-web2-SP-id | myuser@web1.sp1.com |
| 0422592222@idp.com | web2.sp2.com | USER2-web2-SP-id | |
| 0422593333@idp.com | web1.sp1.com | USER3-web1-SP-id | ouruser@web1.sp1.com |
| ⋮ | ⋮ | ⋮ | ⋮ |
| ⋮ | ⋮ | ⋮ | ⋮ |

FIG.24

```
<Assertion ID="_a75adf55-01d7-40cc-929f-dbd8372ebdfc"  IssueInstant="2003-04-17T00:46:02Z" Version="2.0"
 xmlns="urn:oasis:names:tc:SAML:2.0:assertion">
<Issuer> idp.example.com</Issuer>
<Subject>
 <NameID Format=" urn:oasis:names:tc:SAML:2.0:attrname-format:uri ">
 USER1-web1-SP-id    SERVICE USAGE ID
 </NameID>
 <SubjectConfirmation  Method="urn:oasis:names:tc:SAML:2.0:cm:sender-vouches"/>
</Subject>
<AttributeStatement>
 <saml:Attribute>
  <saml:AttributeValue xsi:type="saml:ntt:pf:web:session-id">     call SESSION INFORMATION
  e8b03879d0f5629aa8b5ea6a06736cle
  </saml:AttributeValue>
 </saml:Attribute>
 <saml:Attribute NameFormat="urn:oasis:names:tc:SAML:2.0:attrname-format:uri">
  <saml:AttributeValue xsi:type="urn:oasis:names:tc:SAML:2.0:attrname-format:uri ">
  myuser@web1.sp1.com    USER ID
  </saml:AttributeValue>
 </saml:Attribute>
</AttributeStatement>
(SIGNATURE IS OMITTED)
</Assertion>
```

FIG.25

| call SESSION INFORMATION | USER ID | Web SESSION INFORMATION |
|---|---|---|
| : | : | : |
| : | : | : |
| e8b03879d0f5629aa8b5ea6a06736cle | myuser@web1.sp1.com | 123 |
| e8b03879d0f5629aa8b5ea6a06736cle | ouruser@web1.sp1.com | 456 |
| : | : | : |
| : | : | : |

FIG.26

| USER ID | PASSWORD | NAME | ADDRESS | SEX |
|---|---|---|---|---|
| : | : | : | : | : |
| : | : | : | : | : |
| myuser@web1.sp1.com | 1234 | PATENT TARO | ···, MUSASHINO CITY, TOKYO | MALE |
| ouruser@web1.sp1.com | 2234 | PATENT HANAKO | ···, CHIYODA WARD, TOKYO | FEMALE |
| : | : | : | : | : |
| : | : | : | : | : |

FIG.30

```
<Assertion ID=" a75adf55-01d7-40cc-929f-dbd8372ebdfc"  IssueInstant="2003-04-17T00:46:02Z"
         Version="2.0"
  xmlns="urn:oasis:names:tc:SAML:2.0:assertion">
  <Issuer> idp.example.com</Issuer>
  <Subject>
    <NameID Format=" urn:oasis:names:tc:SAML:2.0:attrname-format:uri ">
      http://idp.com/Web1/User1   [SERVICE USAGE ID]
    </NameID>
    <SubjectConfirmation  Method="urn:oasis:names:tc:SAML:2.0:cm:sender-vouches"/>
  </Subject>
  <AttributeStatement>
    <saml:Attribute>
      <saml:AttributeValue xsi:type="saml:ntt:pf:web:session-id">
        e8b03879d0f5629aa8b5ea6a06736cle  [call SESSION INFORMATION]
      </saml:AttributeValue>
    </saml:Attribute>
  </AttributeStatement>
  (SIGNATURE IS OMITTED)
</Assertion>
```

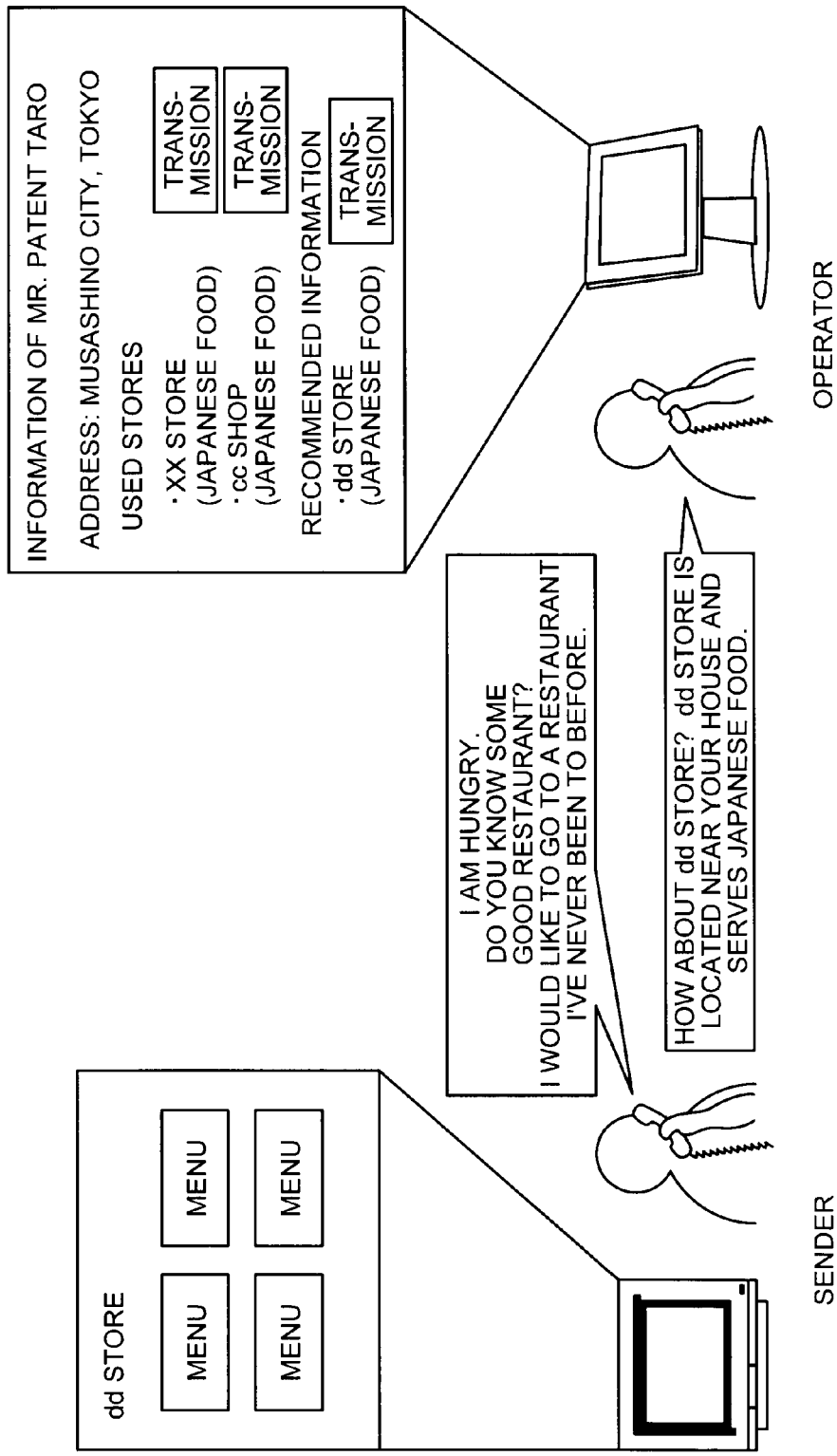

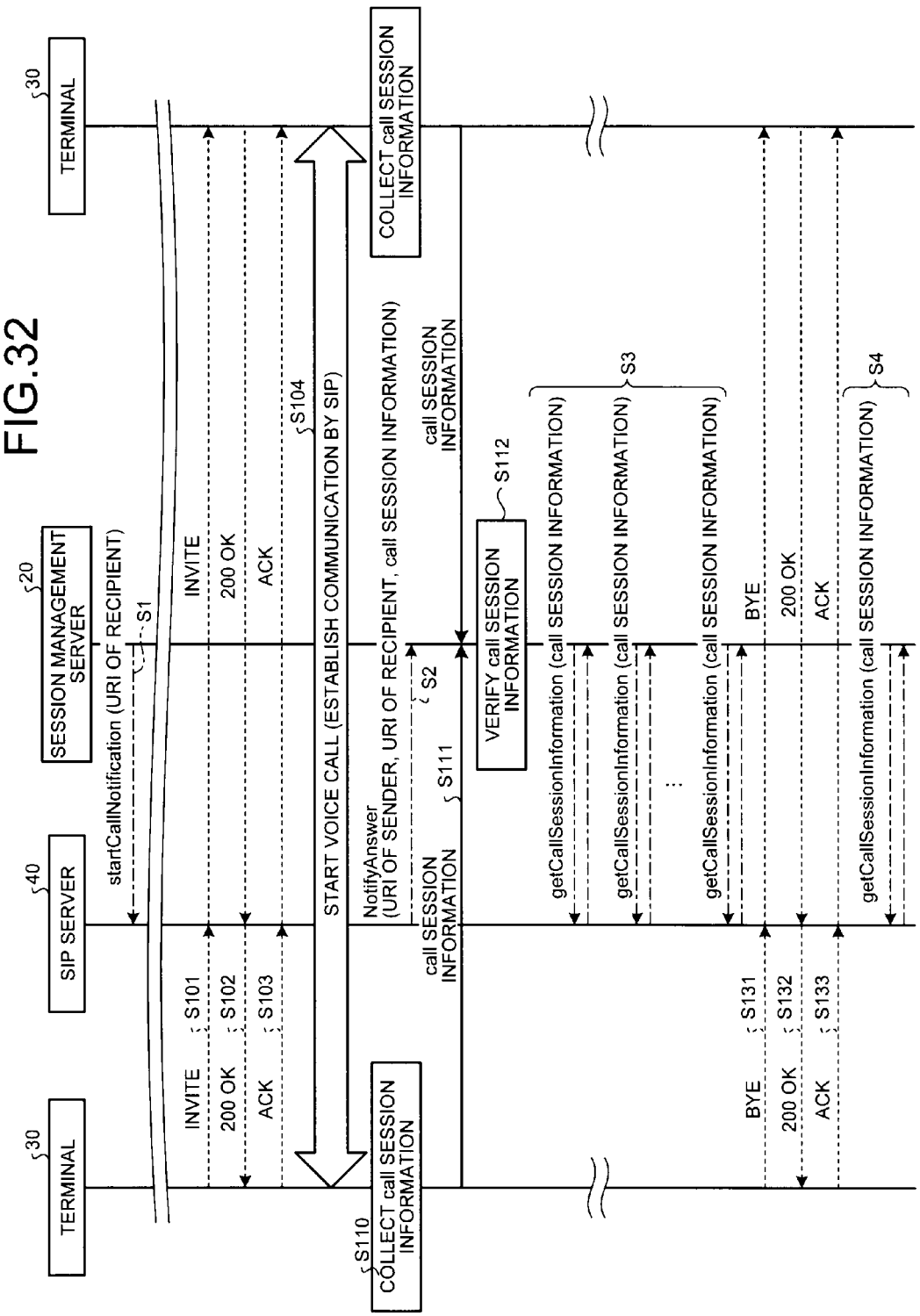

PROVIDING SERVICES BY MANAGING COMMUNICATION RELATIONSHIPS

FIELD

The present invention relates to a service providing system and a service providing method.

BACKGROUND

Conventionally, as a service provided to a terminal connected to an Internet Protocol (IP) network, there is a Web service that uses a World Wide Web (WWW) related technique. Among Web services, there are various advanced Web services such as an Instant Messaging (IM) service. For example, a service providing server that provides an IM service provides advanced Web services such as chatting, sharing of image data, by making Web services provided to terminals cooperate with each other between the terminals.

At this time, the terminal that uses the IM service registers itself in the service providing server as a member in advance. The terminal exchanges membership ID with other members and registers the membership IDs in a buddy list in advance. In this way, the service providing server controls the Web services on the basis of the buddy relationship between the members registered in advance and makes the Web services cooperate with each other between the members. For example, Patent Literature 1 discloses a technique in which membership managements are integrated, and thereby, when new service is used, a membership registration is not required. For example, Patent Literature 2 discloses a technique for sharing an application by using an ordinary browser.

CITATION LIST

Patent Literature

Patent Literature 1: Japanese Unexamined Patent Application Publication No. 2005-228122

Patent Literature 2: Japanese Unexamined Patent Application Publication No. 2003-044429

SUMMARY

Technical Problem

By the way, in the conventional technique described above, there has been a problem that an advanced Web service has not been able to be flexibly provided. In recent years, there are many terminals that establish an ad hoc (temporary) communication relationship between themselves via a network, and it is desired that an advanced Web service can be provided to the terminals having such a communication relationship. However, in the conventional technique in which membership registration is required in advance, the service providing server cannot provide an advanced Web service to the terminals that establish an ad hoc communication relationship.

Therefore, the present invention is made to solve the problem of the conventional technique described above, and a first object of the present invention is to flexibly provide an advanced Web service by, for example, coping with an ad hoc communication relationship.

A second object of the present invention is to provide a high-value-added Web service associated with various information related to a user as well as to cope with an ad hoc communication relationship.

Solution to Problem

According to an aspect of an embodiment of the invention, a service providing system for providing a service on a network to a terminal. The service providing system includes a communication information collecting unit for collecting communication information that identifies communication established between terminals for each terminal; an identification information collecting unit for collecting identification information that identifies a terminal or a user of a terminal as information combined with the communication information for each terminal; an associating unit for identifying communication information pieces indicating the same communication from a plurality of communication information pieces collected by the communication information collecting unit and associating services, which are provided to terminals which establish the communication identified by the identified communication information pieces, with each other; and a service providing unit for, when providing the services associated with each other by the associating unit to the terminals, identifying identification information pieces that identify the terminals or users of the terminals from a plurality of identification information pieces collected by the identification information collecting unit, and controlling service provision so that the services are provided in accordance with information stored in a storage unit in association with the identified identification information pieces.

Advantageous Effects of Invention

An advanced Web service is flexibly provided by, for example, coping with an ad hoc communication relationship.

An ad hoc communication relationship is handled and a high-value-added Web service associated with various information related to a user is provided.

BRIEF DESCRIPTION OF DRAWINGS

FIG. 4 is a diagram for explaining a call session information database.

FIG. 5 is a diagram for explaining a service usage information database.

FIG. 6 is a diagram for explaining a certificate.

FIG. 7 is a diagram for explaining a signature attached to the certificate.

FIG. 10 is a diagram for explaining a store information database.

FIG. 11 is a diagram for explaining a history information database.

FIG. 12 is a sequence diagram showing a processing procedure of the service providing system according to the first embodiment.

FIG. 24 is a diagram for explaining a certificate.

FIG. 25 is a diagram for explaining a session information database.

FIG. 26 is a diagram for explaining a user information database.

FIG. 30 is a diagram for explaining a certificate.

FIG. 31 is a diagram for explaining a service providing screen.

FIG. 32 is a diagram for explaining an example in which communication between a session management server and an SIP server is implemented by using Parlay X.

DESCRIPTION OF EMBODIMENTS

Hereinafter, embodiments of a service providing system and a service providing method according to the present invention will be described with reference to the attached drawings. In the description below, an outline, a configuration, and a processing procedure of a service providing system according to a first embodiment will be described in this order, and then effects of the first embodiment will be described. Thereafter, the other embodiments will be described.

First Embodiment

Outline of Service Providing System According to First Embodiment

Figure 1:
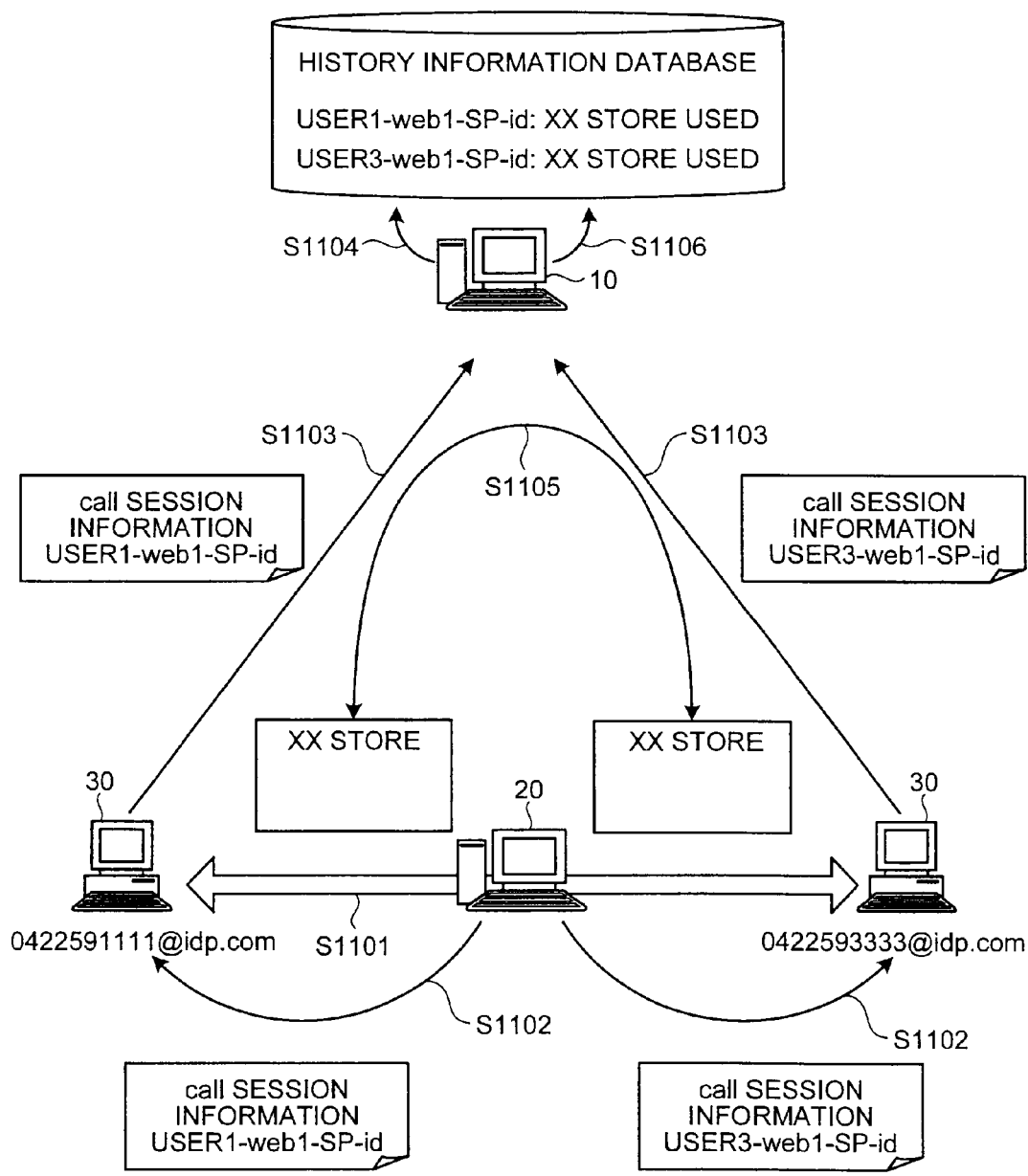
FIG. 1 is a diagram for explaining an outline of a service providing system according to a first embodiment.

First, an outline of the service providing system according to the first embodiment will be described with reference to FIG. 1. FIG. 1 is a diagram for explaining the outline of the service providing system according to the first embodiment.

As shown in FIG. 1, the service providing system according to the first embodiment includes a service providing server 10, a session management server 20, and terminals 30. First, a communication is established between the terminals 30 by Session Initiation Protocol (SIP), and next, the service providing server 10 provides a Web service to each terminal 30 by HTTP (Hyper Text Transfer Protocol) communication.

Specifically, first, a communication is established between the terminals 30 by the SIP, and then a voice call is started between the terminals 30 (step S1101).

Next, the session management server 20 issues a certificate including call session information and service usage ID to each terminal 30 (step S1102). Here, the call session information is information for identifying the communication established by SIP between the terminals 30, and the service usage ID is information identifying the terminal 30.

Each terminal 30 transmits the certificate issued from the session management server 20 and a service use request to the service providing server 10 (step S1103).

On the other hand, as shown in FIG. 1, the service providing server 10 stores service usage ID and history information in association with each other in a history information database. In other words, for the terminal 30 that has used a Web service, the service providing server 10 stores history information in association with the service usage ID identifying the terminal 30. Therefore, when the service providing server 10 receives the certificate from the terminal 30, the service providing server 10 refers to the history information database by using the service usage ID included in the certificate, and searches for the history information (step S1104).

Then, the service providing server 10 identifies that the call session information pieces transmitted from each terminal 30 are call session information pieces indicating the same communication, makes Web services provided to each terminal 30 cooperate with each other, and controls the service provision so that each service is provided according to the searched history information (step S1105).

The service providing server 10 stores history information of the Web services provided to each terminal 30 into the history information database (step S1106).

In this way, according to the service providing system of the first embodiment, it is possible to flexibly provide an advanced Web service by, for example, coping with an ad hoc communication relationship.

Specifically, each terminal 30 does not register in the service providing server 10 as a member in advance, nor do the terminals 30 register the buddy relationship in the service providing server 10 in advance. The relationship between the terminals 30 is only an ad hoc communication relationship in which the communication is established by SIP. In such a case, the service providing system according to the first embodiment causes the service providing server 10 to grasp the ad hoc communication relationship if needed and flexibly provide an advanced Web service such as cooperation of Web services by using the call session information that identifies the ad hoc communication relationship.

According to the service providing system of the first embodiment, it is possible to provide a high-value-added Web service associated with various information related to a user.

Specifically, the service providing server 10 does not register each terminal 30 as a member in advance, but only grasps the relationship between the terminals 30 by using the call session information. In this case, the service providing system according to the first embodiment causes the service providing server 10 to grasp the terminals 30 by issuing the service usage IDs that identify the terminals 30 and using the service usage IDs. As a result, the service providing server 10 can accumulate history information of the terminal 30 that has used a Web service, and when providing a Web service to the terminal 30 again, the service providing server 10 can provide a high-value-added Web service associated with the history information.

Configuration of Service Providing System According to First Embodiment

Next, a configuration of the service providing system according to the first embodiment will be described with reference to FIGS. 2 to 11. In the description below, configurations of the terminal 30, the session management server 20, and the service providing server 10 will be described in this order.

[Terminal]

Figure 2:
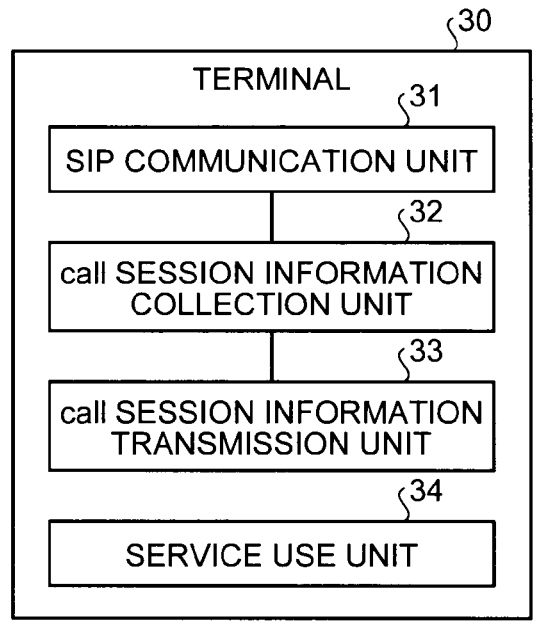
FIG. 2 is a block diagram showing a configuration of a terminal.

First, the configuration of the terminal 30 will be described with reference to FIG. 2. FIG. 2 is a block diagram showing the configuration of the terminal. The terminal 30 is implemented by a general-purpose Personal Computer (PC) or the like that includes units described below. As shown in FIG. 2, the terminal 30 includes an SIP communication unit 31, a call session information collection unit 32, a call session information transmission unit 33, and a service use unit 34.

The SIP communication unit 31 performs communication in the process for establishing communication with another terminal 30 by the SIP (hereinafter referred to SIP communication) and the communication established by the SIP. Specifically, the SIP communication unit 31 is connected to the call session information collection unit 32, and when establishing communication with another terminal 30 by the SIP, the SIP communication unit 31 notifies the call session information collection unit 32 that the communication is established. The SIP communication performed by the terminal 30 and the communication established by the SIP are performed via the session management server 20.

The call session information collection unit 32 collects call session information that uniquely identifies the communication established between the terminal 30 and another terminal 30. Specifically, the call session information collection unit 32 is connected to the SIP communication unit 31 and the call session information transmission unit 33. When information indicating that the communication is established is notified from the SIP communication unit 31, the call session information collection unit 32 collects the call session information from information included in the SIP communication, and notifies the call session information transmission unit 33 of the collected call session information.

Here, the call session information will be described. Essentially, the session information is information that uniquely identifies communication in the fifth layer of the Open Systems Interconnection (OSI) model. Specifically, in the service providing system according to the first embodiment, although it is assumed that SIP communication and HTTP communication are performed as communication, the SIP communication and the HTTP communication cannot be distinguished in the fourth layer because both the SIP communication and the HTTP communication are Transmission Control Protocol (TCP) communication. Therefore, by adding the session information to the communication established between the terminals 30, the communication is identified to be the SIP communication or the HTTP communication. Specifically, the call session information is session information indicating that the communication is the SIP communication.

The session information not only distinguishes the SIP communication and the HTTP communication, but also identifies that the communication established between the terminals 30 is different from communication established between the other terminals 30. In other words, the call session information is information identifying the communication established by the SIP between the terminals 30. For example, the call session information collection unit 32 collects "Call-ID", "From", "To", "tag", or an IP address included in the SIP communication or a combination thereof, and also collects other information included in the SIP communication. The call session information may be any information that can uniquely identify the communication established by the SIP.

The call session information transmission unit 33 transmits the call session information to the session management server 20. Specifically, the call session information transmission unit 33 is connected to the call session information collection unit 32, and when the call session information is notified from the call session information collection unit 32, the call session information transmission unit 33 transmits the notified call session information to the session management server 20. The terminals 30 in the first embodiment store the Uniform Resource Locator (URL) of the session management server 20 in a storage unit (not shown in the figures) in advance. Therefore, the call session information transmission unit 33 refers to the storage unit to obtain the URL of the session management server 20 and transmits the call session information to the obtained URL.

The service use unit 34 receives a service provided by the service providing server 10. Specifically, to receive the service, the service use unit 34 transmits the certificate issued and transmitted by the session management server 20 to the service providing server 10. The service use unit 34 receives Web session information from the service providing server 10, provides the received Web session information to a Web browser, and accesses the service providing server 10.

Here, the Web session information will be described. In a similar manner as the call session information, the Web session information is session information indicating that the communication is the HTTP communication. The Web session information is information that uniquely identifies the HTTP communication established between the terminal 30 and the service providing server 10. For example, the Web session information is implemented by a Cookie ID or the like. The Web session information may be any information that can uniquely identify the HTTP communication established between the terminal 30 and the service providing server 10.

[Session Management Server]

Figure 3:
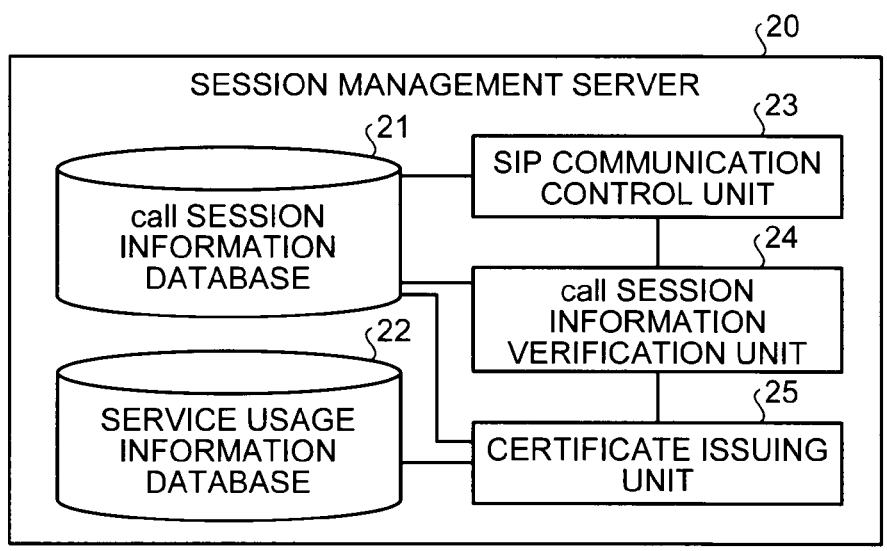
FIG. 3 is a block diagram showing a configuration of a session management server.

Next, a configuration of the session management server 20 will be described with reference to FIGS. 3 to 7. FIG. 3 is a block diagram showing a configuration of the session management server. FIG. 4 is a diagram for explaining a call session information database. FIG. 5 is a diagram for explaining a service usage information database. FIG. 6 is a diagram for explaining the certificate. FIG. 7 is a diagram for explaining a signature attached to the certificate.

The session management server 20 is implemented by a general-purpose server or the like that includes units described below. As shown in FIG. 3, the session management server 20 includes a call session information database 21, a service usage information database 22, an SIP communication control unit 23, a call session information verification unit 24, and a certificate issuing unit 25.

The call session information database 21 stores the call session information. Specifically, the call session information database 21 is connected to the SIP communication control unit 23, the call session information verification unit 24, and the certificate issuing unit 25, and used for processing by the SIP communication control unit 23, the call session information verification unit 24, or the certificate issuing unit 25.

For example, the call session information database 21 stores information as shown in FIG. 4. Here, the session management server 20 according to the first embodiment does not issue a certificate by describing the call session information transmitted from the terminal 30 into the certificate without change, but encrypts the call session information to issue the certificate. Therefore, as shown in FIG. 4, in addition to the call session information "Call-ID", "From", and "To" transmitted from the terminal 30, the call session information database 21 stores "call session information" encrypted in association with the above call session information.

The service usage information database 22 stores service usage information. Specifically, the service usage information database 22 is connected to the certificate issuing unit 25 and used for processing by the certificate issuing unit 25.

For example, as shown in FIG. 5, the service usage information database 22 stores "SIP-URI (Uniform Resource Identifier)", "service providing server URI", and "service usage ID" in association with each other. The session management server 20 in the first embodiment issues a service usage ID for each combination of a terminal and a service used by the terminal. Therefore, the service usage information database 22 stores the "service usage ID" in association with a combination of "SIP-URI" that uniquely identifies the terminal and the "service providing server URI" that uniquely identifies the service. For example, although "0422591111@idp.com" shown in the third row in FIG. 5 and "0422591111@idp.com" shown in the fourth row are an SIP-URI indicating the same terminal, different service usage IDs "USER1-web1-SP-id" and "USER1-web2-SP-id" are issued for each service to be used. The service usage ID may be any information by which the service providing server 10 identifies the terminal 30. For example, the service usage ID may be a random number.

The SIP communication control unit 23 controls the SIP communication performed between the terminals 30, the communication established by the SIP, communication to disconnect the communication established by the SIP, or the like. The SIP communication control unit 23 is connected to the call session information database 21 and the call session information verification unit 24, stores the call session information transmitted from the terminal 30 into the call session information database 21, and notifies the call session information verification unit 24 that the call session information is stored. For example, the SIP communication control unit 23 stores the call session information "Call-ID", "From", "To", "tag", or an IP address transmitted from the terminal 30, a combination of these, or other information included in the SIP into the call session information database 21. FIG. 4 is a diagram showing the call session information database 21 in which, for example, "Call-ID", "From", and "To" of the call session information are stored by the SIP communication control unit 23.

The call session information verification unit 24 verifies the call session information. Specifically, the call session information verification unit 24 is connected to the call session information database 21, the SIP communication control unit 23, and the certificate issuing unit 25, and refers to the call session information database 21 when notified that the call session information is stored from the SIP communication control unit 23. The call session information verification unit 24 verifies whether or not the stored call session information is certainly information that uniquely identifies the communication established by the session management server 20, and notifies the certificate issuing unit 25 of the verification result.

The certificate issuing unit 25 issues a service usage ID and issues a certificate including call session information and the service usage ID. Specifically, the certificate issuing unit 25 is connected to the call session information database 21, the service usage information database 22, and the call session information verification unit 24, and when the verification result is notified from the call session information verification unit 24, the certificate issuing unit 25 refers to the call session information database 21 and stores encrypted call cession information into the call session information database 21.

When the certificate issuing unit 25 receives service selection information from the terminal 30, the certificate issuing unit 25 issues a service usage ID in association with a combination of the SIP-URI that uniquely identifies the terminal 30 and the service providing server URI that uniquely identifies the service indicated by the service selection information, and stores the service usage ID into the service usage information database 22. The certificate issuing unit 25 issues a certificate including the call session information stored in the call session information database 21 and the service usage ID stored in the service usage information database 22, and transmits the certificate to the terminal 30. At this time, the certificate issuing unit 25 transmits the certificate along with a redirect instruction for instructing the terminal 30 to change the access destination to the URL of the service providing server 10.

For example, as shown in FIGS. 6 and 7, the certificate issuing unit 25 issues a certificate of a Security Assertion Markup Language (SAML) format in which a signature of the session management server 20 is attached to the call session information and the service usage ID. In FIG. 6, the signature, and the like is omitted, and FIG. 7 shows the signature and a public key. Here, the SAML format is a protocol specified in order to exchange authentication information by using data described in Extensible Markup Language (XML), and is a format capable of checking that data is not tampered and verifying a source of issued data and the like by a signature. The certificate issuing unit 25 issues data in which the call session information, the service usage ID, a certificate issued from a certificate authority which certifies that the public key of the session management server 20 is authenticated, and a signature obtained by encrypting the call session information and the service usage ID (hash value) by a secret key of the session management server 20 are described in the SAML format.

Although, in the first embodiment, a method for issuing a certificate of XML format is described as a method for transmitting the call session information and the service usage ID, the present invention is not limited to this. As a method for transmitting the call session information and the service usage ID, it is possible to use, for example, a method by a GET method supported by HTTP (a method for transmitting a URI as a parameter from which the call session information and the service usage ID can be obtained) and a method by a POST method (a method for transmitting the body text of a predetermined format including the call session information and the service usage ID). In these methods, by attaching a signature to a parameter, in the same manner as in the certificate of XML format, it is possible to have a format capable of checking that data is not tampered and verifying a source of issued data and the like by a signature.

[Service Providing Server]

Figures 8, 9:
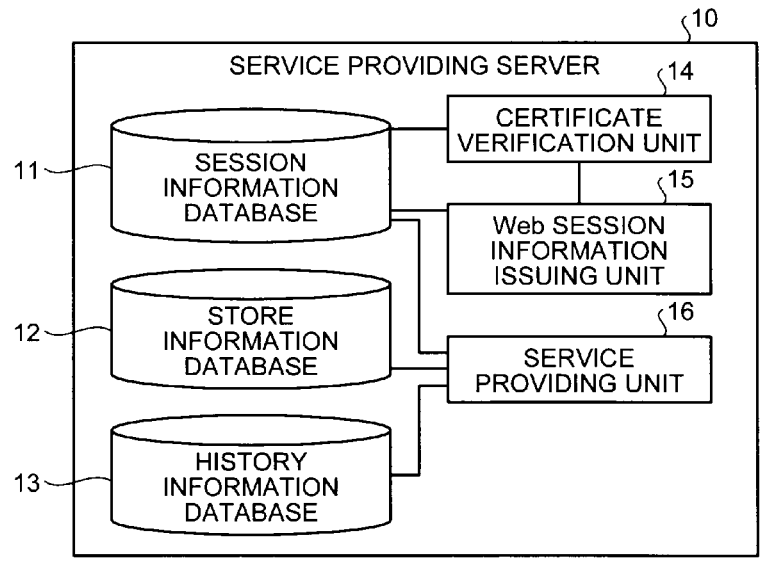
FIG. 8 is a block diagram showing a configuration of a service providing server.
FIG. 9 is a diagram for explaining a session information database.

Next, a configuration of the service providing server 10 will be described with reference to FIGS. 8 to 11. FIG. 8 is a block diagram showing the configuration of the service providing server. FIG. 9 is a diagram for explaining a session information database. FIG. 10 is a diagram for explaining a store information database. FIG. 11 is a diagram for explaining a history information database.

The service providing server 10 is implemented by a general-purpose server or the like that includes units described below. As shown in FIG. 8, the service providing server 10 includes a session information database 11, a store information database 12, a history information database 13, a certificate verification unit 14, a Web session information issuing unit 15, and a service providing unit 16.

The session information database 11 stores the call session information, the service usage ID, and the Web session information in association with each other. Specifically, the session information database 11 is connected to the certificate verification unit 14, the Web session information issuing unit 15, and the service providing unit 16, and used for processing by the certificate verification unit 14, the Web session information issuing unit 15, and the service providing unit 16. For example, the session information database 11 stores information as shown in FIG. 9.

The store information database 12 stores the store information which is content of the service provided by the service providing server 10. Specifically, the store information database 12 is connected to the service providing unit 16 and used for processing by the service providing unit 16. For example, the store information database 12 stores information as shown in FIG. 10.

The history information database 13 stores service usage history information for each service usage ID. Specifically, the history information database 13 is connected to the service providing unit 16 and used for processing by the service providing unit 16. For example, the history information database 13 stores information as shown in FIG. 11.

The certificate verification unit 14 verifies a certificate. Specifically, the certificate verification unit 14 is connected to the session information database 11 and the Web session information issuing unit 15, and when the certificate issued by the session management server 20 is transmitted from the terminal 30, the certificate verification unit 14 verifies the certificate and notifies the Web session information issuing unit 15 of the verification result.

For example, the certificate verification unit 14 decrypts the signature by using the public key (verified to be an authenticated public key by a certificate authority) of the session management server 20 included in the certificate and retrieves a hash value of the call session information and the service usage ID. Also, the certificate verification unit 14 calculates a hash value from the call session information and the service usage ID themselves. Then the certificate verification unit 14 verifies that the call session information and the service usage ID are true and correct information by comparing the hash value retrieved from the signature and the calculated hash value. Specifically, as a comparison result, if the hash value retrieved from the signature and the calculated hash value are the same, the following facts can be verified: (a) the call session information and the service usage ID are certainly information issued from the session management server 20, (b) the call session information and the service usage ID are not tampered, and (c) the session management server 20 does not deny the fact that the session management server 20 has transmitted the call session information and the service usage ID. Thus, it is possible to verify that the call session information and the service usage ID are true and correct information.

The Web session information issuing unit 15 issues the Web session information. Specifically, the Web session information issuing unit 15 is connected to the session information database 11 and the certificate verification unit 14, and when the verification result of the certificate is notified from the certificate verification unit 14, the Web session information issuing unit 15 issues Web session information and stores the call session information, the service usage ID, and the Web session information in association with each other into the session information database 11.

The service providing unit 16 provide a service. Specifically, the service providing unit 16 is connected to the session information database 11, the store information database 12, and the history information database 13, and when accessed from the terminal 30 with the Web session information, the service providing unit 16 refers to the session information database 11 by using the Web session and obtains the call session information and the service usage ID. The service providing unit 16 refers to the history information database 13 by using the service usage ID, and obtains the history information. The service providing unit 16 controls service provision so that services are provided to the terminal 30 in accordance with the history information. The service providing unit 16 stores history information of the service used by the terminal 30 in association with the service usage ID into the history information database 13.

When, among a plurality of the call session information pieces stored in the session information database 11, predetermined call session information pieces indicate the same established communication, the service providing unit 16 controls the services provided using the Web session information pieces in association with each other.

For example, as shown in FIG. 9, the service providing unit 16 determines that, among a plurality of the call session information pieces stored in the session information database 11, two call session information pieces "e8b03879d0f5629aa8b5ea6a06736cle" indicate the same communication established by the SIP. Then, the service providing unit 16 controls the service provided by using HTTP communication to which the Web session information "123" stored in association with the call session information "e8b03879d0f5629aa8b5ea6a06736cle" is provided and the service provided by using HTTP communication to which the Web session information "456" stored in association with the same call session information is provided in association with each other.

For example, it is assumed that one terminal 30 uploads image data to the service providing server 10 by the HTTP communication to which the Web session information "456" is provided when the other terminal 30 accesses the service providing server 10 by the HTTP communication to which the Web session information "123" is provided. In this case, the relationship between the terminals 30 is assumed to be a relationship in which the same communication is established by the SIP, so that it is determined that the terminals 30 allow sharing of the image data with each other, and the service providing unit 16 according to the first embodiment controls the service so that the image data is transmitted to the other terminal 30.

Here, the service provision by the service providing server 10 will be considered again. Although the manner in which the service provision by the service providing server 10 is controlled on the basis of the relationship between the terminals 30 is the same as in a conventional service providing server, how the service providing server 10 of the first embodiment grasps the "relationship between the terminals 30" will be described.

Specifically, the service providing server 10 according to the first embodiment does not grasp the buddy relationship registered in the storage unit in advance as the "relationship between the terminals 30" as in the manner of the conventional service providing server, but the service providing unit 16 grasps the "relationship between the terminals 30" when the call session information pieces indicate the same communication established by the SIP. In other words, even when a relationship between terminals that communicate with each other is temporary, such as the relationship between the terminals 30 which establish the same communication by the SIP, the service providing server 10 can provide a service in association with the temporary communication relationship by associating the HTTP communications performed by the terminals 30 with each other on the basis of the temporary communication relationship.

As in the manner of the first embodiment, when first communication is the communication in the process for establishing communication by the SIP, it is meaningful that the "relationship between the terminals 30" is a relationship authenticated by the SIP. In the SIP communication, Digest authentication is usually performed, so that a fact that a communication is established between the terminals 30 by the SIP indicates that the relationship between the terminals 30 has been authenticated.

Processing Procedure of Service Providing System According to First Embodiment

Figure 13:
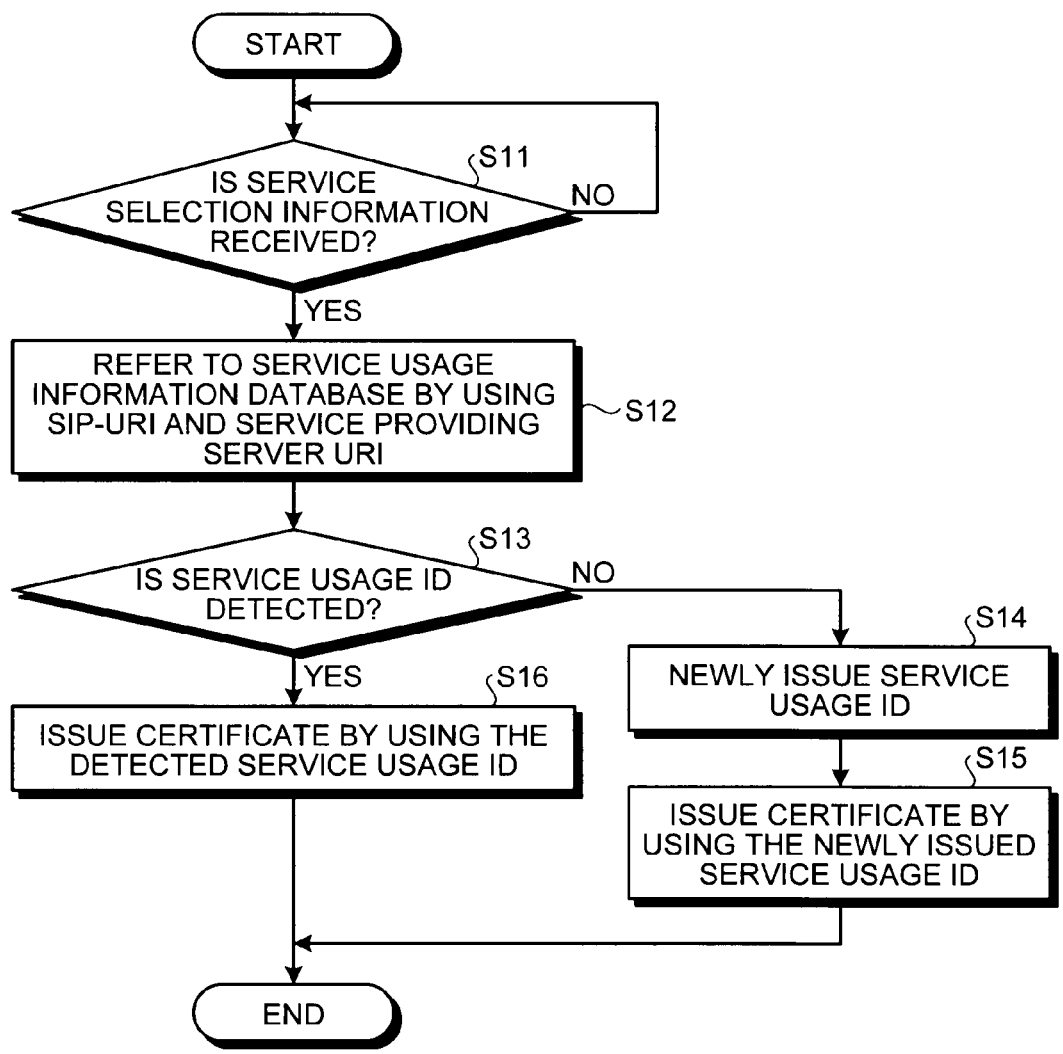
FIG. 13 is a flowchart showing a processing procedure of a certificate issuing unit.
Figure 14:
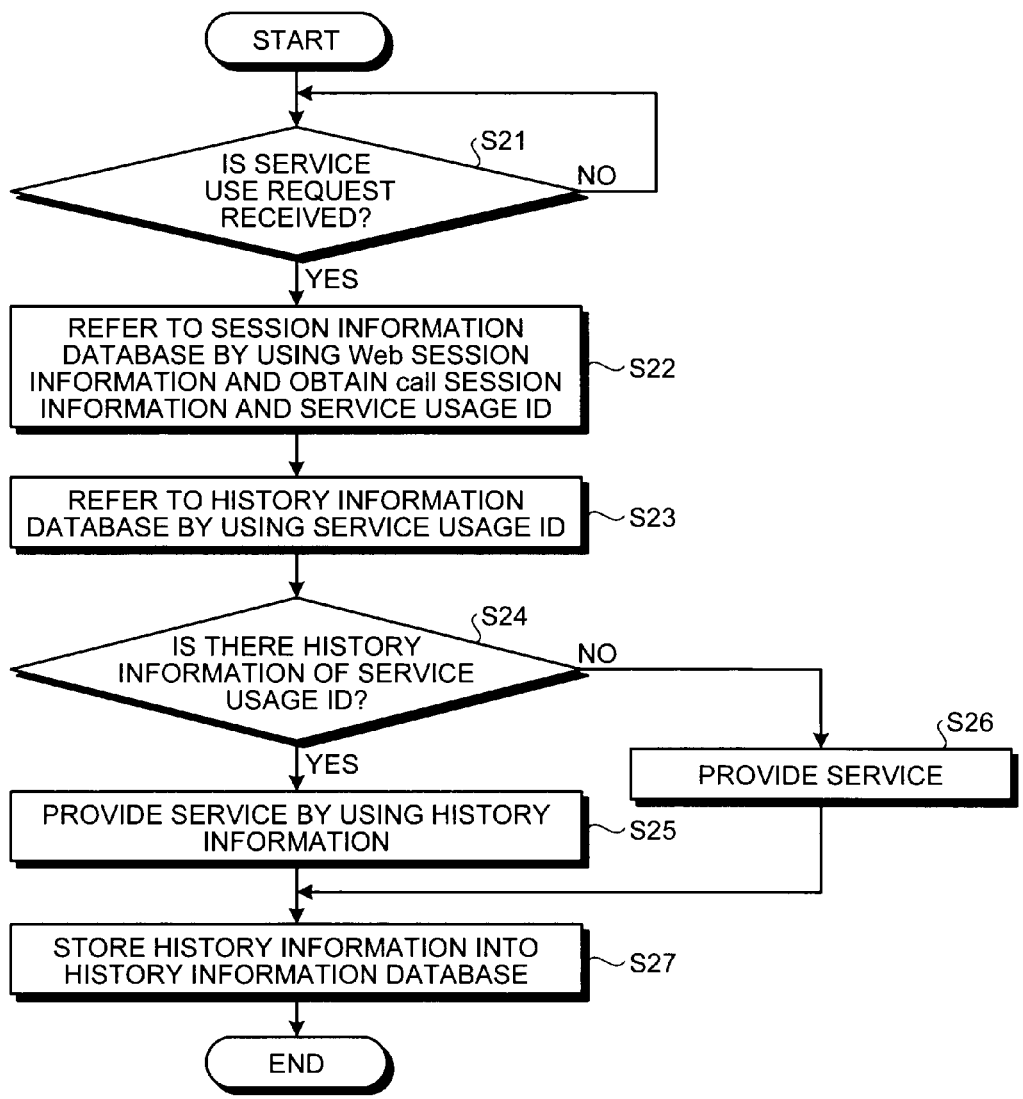
FIG. 14 is a flowchart showing a processing procedure of a service providing unit.

Next, a processing procedure of the service providing system according to the first embodiment will be described with reference to FIGS. 12 to 14. FIG. 12 is a sequence diagram showing the processing procedure of the service providing system according to the first embodiment. FIG. 13 is a flowchart showing a processing procedure of the certificate issuing unit. FIG. 14 is a flowchart showing a processing procedure of the service providing unit.

As shown in FIG. 12, first, by the control of the SIP communication control unit 23 of the session management server 20, the SIP communication from step S101 to step S103 is performed between the terminals 30. As a result, in step S104, a communication is established between the terminals 30 by the SIP.

When the communication is established between the terminals 30 by the SIP, the call session information collection unit 32 of the terminals 30 collects the call session information from information included in the SIP communication (step S110), and the call session information transmission unit 33 transmits the call session information to the session management server 20 (step S111).

Then the call session information verification unit 24 of the session management server 20 verifies the call session information (step S112), and the certificate issuing unit 25 transmits a service menu screen to the terminals 30 (step S113).

When a predetermined service of a plurality of services displayed on the menu screen is selected by, for example, being pressed by a user of the terminal 30, the service use unit 34 of the terminal 30 transmits service selection information to the management server 20 (step S114).

Then the certificate issuing unit 25 of the management server 20 issues a service usage ID in association with a combination of the SIP-URI that uniquely identifies the terminal 30 and the service providing server URI that uniquely identifies the service indicated by the service selection information. The certificate issuing unit 25 issues a certificate that includes the call session information and the service usage ID (step S115).

Next, the certificate issuing unit 25 transmits the issued certificate along with a redirect instruction for instructing the terminal 30 to change the access destination to the URL of the service providing server 10 (step S116).

On the other hand, the service use unit 34 of the terminal 30 is redirected by the redirect instruction transmitted from the session management server 20, and accesses the service providing server 10 (step S117). At this time, the service use unit 34 accesses the service providing server 10 with the certificate issued by the session management server 20.

Then the certificate verification unit 14 of the service providing server 10 verifies the certificate, and the Web session information issuing unit 15 issues the Web session information (step S118) and transmits the issued Web session information to the terminal 30 (step S119).

Subsequently, the certificate verification unit 14 stores the call session information, the service usage ID, and the Web session information in association with each other into the session information database 11, and associates the call session information, the service usage ID, and the Web session information with each other (step S120).

Thereafter, when the service use unit 34 of the terminal 30 accesses the service providing server 10 with the Web session information, the service providing unit 16 of the service providing server 10 provides a service by using the history information stored in the history information database 13 in association with the service usage ID. The service providing unit 16 stores history information of the service used by the terminal 30 in association with the service usage ID into the history information database 13 (step S121).

Although, in the first embodiment, a method is described in which the session management server 20 transmits the menu screen to the terminal 30 in step S113 and the terminal 30 transmits the service selection information to the session management server 20 in step S114, the present invention is not limited to this. For example, if the session management server 20 sets a service providing server 10 to be used for each combination of the terminals 30 in advance, step S113 and step S114 may be omitted and the process may proceed to step S115.

[Processing Procedure of Certificate Issuing Unit]

Next, step S115 shown in FIG. 12 will be described in detail with reference to FIG. 13.

First, the certificate issuing unit 25 of the session management server 20 determines whether or not the service selection information is received from the terminal 30 (step S11), and when the service selection information is not received (No in step S11), the certificate issuing unit 25 repeatedly performs the processing for determining whether or not the service selection information is received.

On the other hand, when the service selection information is received (Yes in step S11), the certificate issuing unit 25 refers to the service usage information database 22 by using the SIP-URI that uniquely identifies the terminal 30 and the service providing server URI that uniquely identifies the service indicated by the service selection information (step S12).

When the certificate issuing unit 25 cannot detect the service usage ID (No in step S13), the certificate issuing unit 25 newly issues a service usage ID (step S14), issues a certificate that includes the call session information and the newly issued service usage ID (step S15), and ends the processing.

On the other hand, when the certificate issuing unit 25 can detect the service usage ID (Yes in step S13), the certificate issuing unit 25 issues a certificate that includes the call session information and the detected service usage ID (step S16), and ends the processing.

[Processing Procedure of Service Providing Unit]

Next, step S121 shown in FIG. 12 will be described in detail with reference to FIG. 14.

First, the service providing unit 16 of the service providing server 10 determines whether or not the service use request is received (whether or not the service providing unit 16 is accessed from the terminal 30 with the Web session information) (step S21), and when the service use request is not received (No in step S21), the service providing unit 16 repeatedly performs the processing for determining whether or not the service use request is received.

On the other hand, when the service use request is received (Yes in step S21), the service providing unit 16 refers to the session information database 11 by using the Web session information, and obtains the call session information and the service usage ID (step S22).

Then the service providing unit 16 refers to the history information database 13 by using the service usage ID (step S23), and when there is the history information of the service usage ID (Yes in step S24), the service providing unit 16 provides a service to the terminal 30 by using the history information (step S25). For example, the service providing server 16 refers to the history information and provides information of Japanese food considered to be the favorite of users of the terminals 30.

On the other hand, when there is not the history information (No in step S24), the service providing unit 16 provides a service without using the history information (step S26). In both cases in which a service is provided by using the history information and in which a service is provided without using the history information, the service providing unit 16 provides the services to be provided to the terminals 30 in association with each other. When, among a plurality of the call session information pieces stored in the session information database 11, two call session information pieces indicate the same communication established by the SIP, the service providing unit 16 controls the services, which are provided using HTTP communications to which the Web session information pieces stored in association with the call cession information pieces are provided, in association with each other.

Then the service providing unit 16 stores the history information of the service used by the terminal 30 in association with the service usage ID into the history information database 13 (step S27), and ends the processing.

Effects of First Embodiment

As described above, in the service providing system according to the first embodiment, the service providing server 10 collects the call session information that identifies a communication established between the terminals 30 from each terminal 30. Also, the service providing server 10 collects the service usage ID that identifies the terminal 30 from each terminal 30 as information of a combination of the service usage ID and the call session information. The service providing server 10 identifies call session information pieces that indicate the same communication from a plurality of call session information pieces, and associates the services to be provided to the terminals 30 that establish the communication identified by the identified call session information pieces with each other. In addition, when providing each associated service to each terminal 30, the service providing server 10 identifies the service usage IDs that identify the terminals 30 from a plurality of service usage IDs, and controls the service provision so that each service is provided in accordance with the history information stored in the storage unit in association with the identified service usage IDs.

In this way, according to the service providing system of the first embodiment, it is possible to flexibly provide an advanced Web service by, for example, coping with an ad hoc communication relationship.

Specifically, each terminal 30 does not register in the service providing server 10 as a member in advance, nor do the terminals 30 register the buddy relationship in the service providing server 10 in advance. The relationship between the terminals 30 is only an ad hoc communication relationship in which the communication is established by SIP. In such a case, the service providing system according to the first embodiment causes the service providing server 10 to grasp the ad hoc communication relationship if needed and flexibly provide an advanced Web service such as cooperation of Web services by using the call session information that identifies the ad hoc communication relationship.

According to the service providing system of the first embodiment, it is possible to provide a high-value-added Web service associated with various information related to a user.

Specifically, the service providing server 10 does not register each terminal 30 as a member in advance, but only grasps the relationship between the terminals 30 by using the call session information. In this case, the service providing system according to the first embodiment causes the service providing server 10 to grasp the terminals 30 by issuing the service usage IDs that identify the terminals 30 and using the service usage IDs. As a result, the service providing server 10 can accumulate history information of the terminal 30 that has used a Web service, and when providing a Web service to the terminal 30 again, the service providing server 10 can provide a high-value-added Web service associated with the history information.

According to the first embodiment, the session management server 20 uses a pseudonym ID instead of a telephone number as a service usage ID. Therefore, it is possible to prevent a user from being identified in the service providing server 10.

According to the first embodiment, the service usage ID is issued for each combination of the terminal 30 and the service. In this case, it is possible to prevent a user identification operation performed by a plurality of Web servers conspiring with each other.

Second Embodiment

In the above description, as the first embodiment, a case example in which the service providing server 10 stores the service usage ID and the history information in association with each other and provides a Web service by using the history information has been described. However, the present invention is not limited to this. The present invention can be also applied to a case example in which the service providing server 10 stores user information related to a user registered in the service providing server 10 as a member in advance and the service usage ID in association with each other and provides a Web service by using the user information. Hereinafter, the case example to which the present invention is applied will be described as a second embodiment.

Outline of Service Providing System According to Second Embodiment

Figure 15:
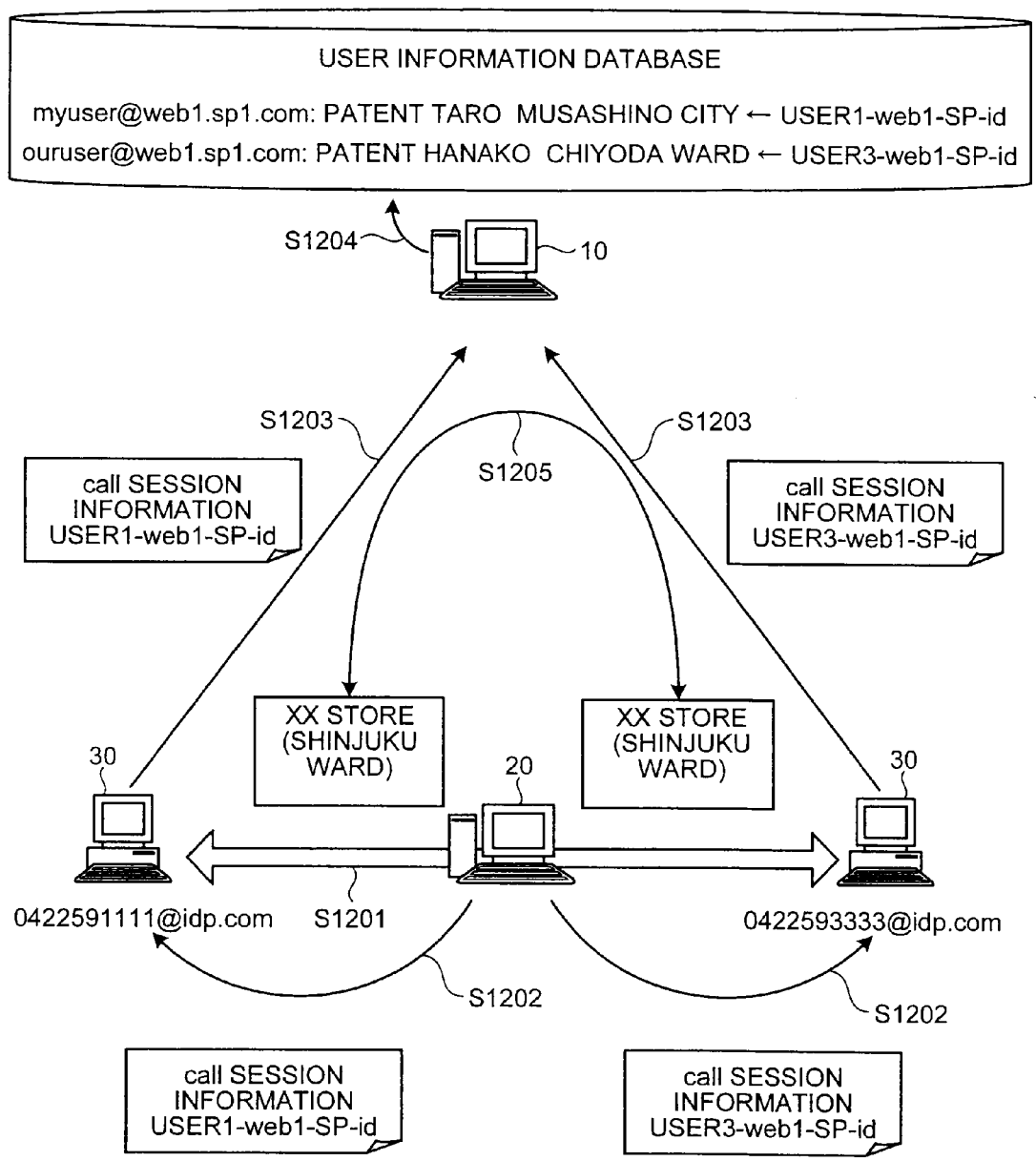
FIG. 15 is a diagram for explaining an outline of a service providing system according to a second embodiment.

First, an outline of the service providing system according to the second embodiment will be described with reference to FIG. 15. FIG. 15 is a diagram for explaining the outline of the service providing system according to the second embodiment.

As shown in FIG. 15, the service providing system according to the second embodiment includes a user information database in which the service providing server 10 stores user information related to a user registered in the service providing server 10 as a member in advance and the service usage ID in association with each other. Although the service providing server 10 associates the Web services provided to the terminals 30 with each other in the same manner as in the first embodiment, at this time, the service providing server 10 controls the service provision so that the services are provided in accordance with the user information.

Specifically, in the same manner as in the first embodiment, first, a communication is established between the terminals 30 by the SIP, and then a voice call is started between the terminals 30 (step S1201).

Next, in the same manner as in the first embodiment, the session management server 20 issues a certificate including the call session information and the service usage ID to each terminal 30 (step S1202).

Each terminal 30 transmits the certificate issued from the session management server 20 and a service use request to the service providing server 10 (step S1203). Although not shown in FIG. 15, the terminals 30 perform a log-in operation when using a Web service for the first time. For example, each terminal 30 transmits a user ID and a password to the service providing server 10. Then, the service providing server 10 performs authentication on each terminal 30, and when the authentication is successfully performed, the service providing server 10 stores the service usage ID in association with the user ID in the user information database.

Therefore, when the service providing server 10 receives the certificate from the terminal 30 after the first time, the service providing server 10 refers to the user information database by using the service usage ID included in the certificate, and searches for the user information (step S1204).

Then, in the same manner as in the first embodiment, the service providing server 10 identifies that the call session information pieces transmitted from each terminal 30 are call session information pieces indicating the same communication and makes Web services provided to each terminal 30 cooperate with each other, and, different from the first embodiment, the service providing server 10 controls the service provision so that each service is provided according to the searched user information (step S1205).

Based on this, according to the service providing system of the second embodiment, it is possible to provide a high-value-added Web service by associating with the user information registered as a member in advance.

For example, as shown in FIG. 15, the service providing server 10 uses the user information indicating that the address of the user ID "myuser@web1.sp1.com" is " . . . , Musashino City, Tokyo" and the address of the user ID "ouruser@web1.sp1.com" is " . . . , Chiyoda Ward, Tokyo", and thereby can introduce a store located in "Shinjuku Ward" which is in the center of the above addresses.

Configuration of Service Providing System
According to Second Embodiment

Figures 16, 17:
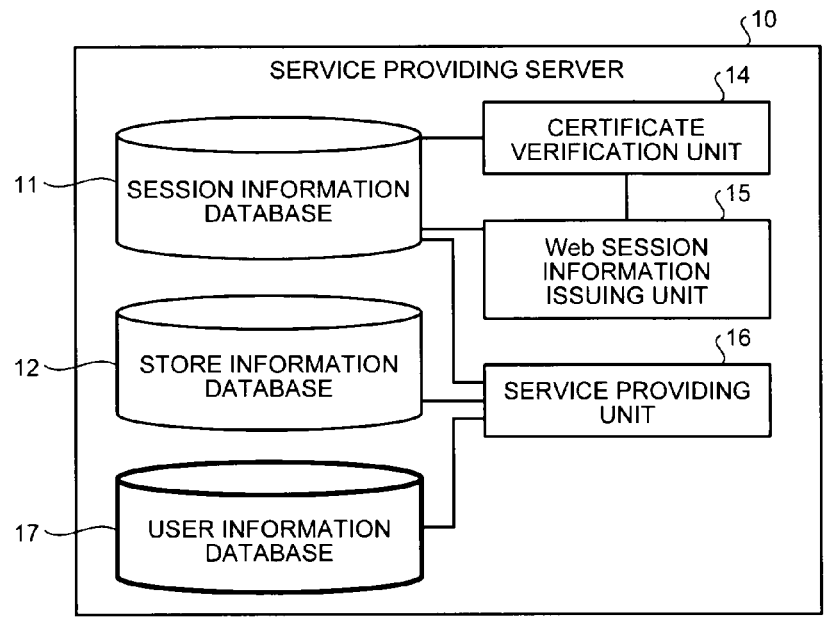
FIG. 16 is a block diagram showing a configuration of a service providing server.
FIG. 17 is a diagram for explaining a user information database.

Next, a configuration of the service providing system according to the second embodiment will be described with reference to FIGS. 16 and 17. FIG. 16 is a block diagram showing the configuration of the service providing server. FIG. 17 is a diagram for explaining the user information database. Hereinafter, only a configuration of the service providing system according to the second embodiment, which is different from that according to the first embodiment, will be described.

As shown in FIG. 16, the service providing server 10 according to the second embodiment further includes a user information database 17. Although the service providing server 10 according to the second embodiment does not include the history information database 13, the service providing server 10 may includes the history information database 13 in the same manner as in the first embodiment. In this case, the service providing unit 16 not only can provide a Web service by using the user information, but also can provide a Web service by using the user information and the history information.

The user information database 17 stores user information related to a user registered in advance in the service providing server 10 as a member in advance and the service usage ID in association with each other. Specifically, the user information database 17 is connected to the service providing unit 16 and used for processing by the service providing unit 16. For example, the user information database 17 stores information as shown in FIG. 17.

The service providing unit 16 according to the second embodiment provides a service in the same manner as in the first embodiment, different from the first embodiment, the service providing unit 16 provides a service in association with the user information. Specifically, the service providing unit 16 is connected to the session information database 11, the store information database 12, and the user information database 17, and when accessed from the terminal 30 with the Web session information, the service providing unit 16 refers to the session information database 11 by using the Web session information and obtains the call session information and the service ID. The service providing unit 16 refers to the user information database 17 by using the service usage ID, and obtains the user information stored in association with the service usage ID. The service providing unit 16 controls the service provision so that services are provided to the terminal 30 in accordance with the user information.

Processing Procedure of Service Providing System
According to Second Embodiment

Figure 18:
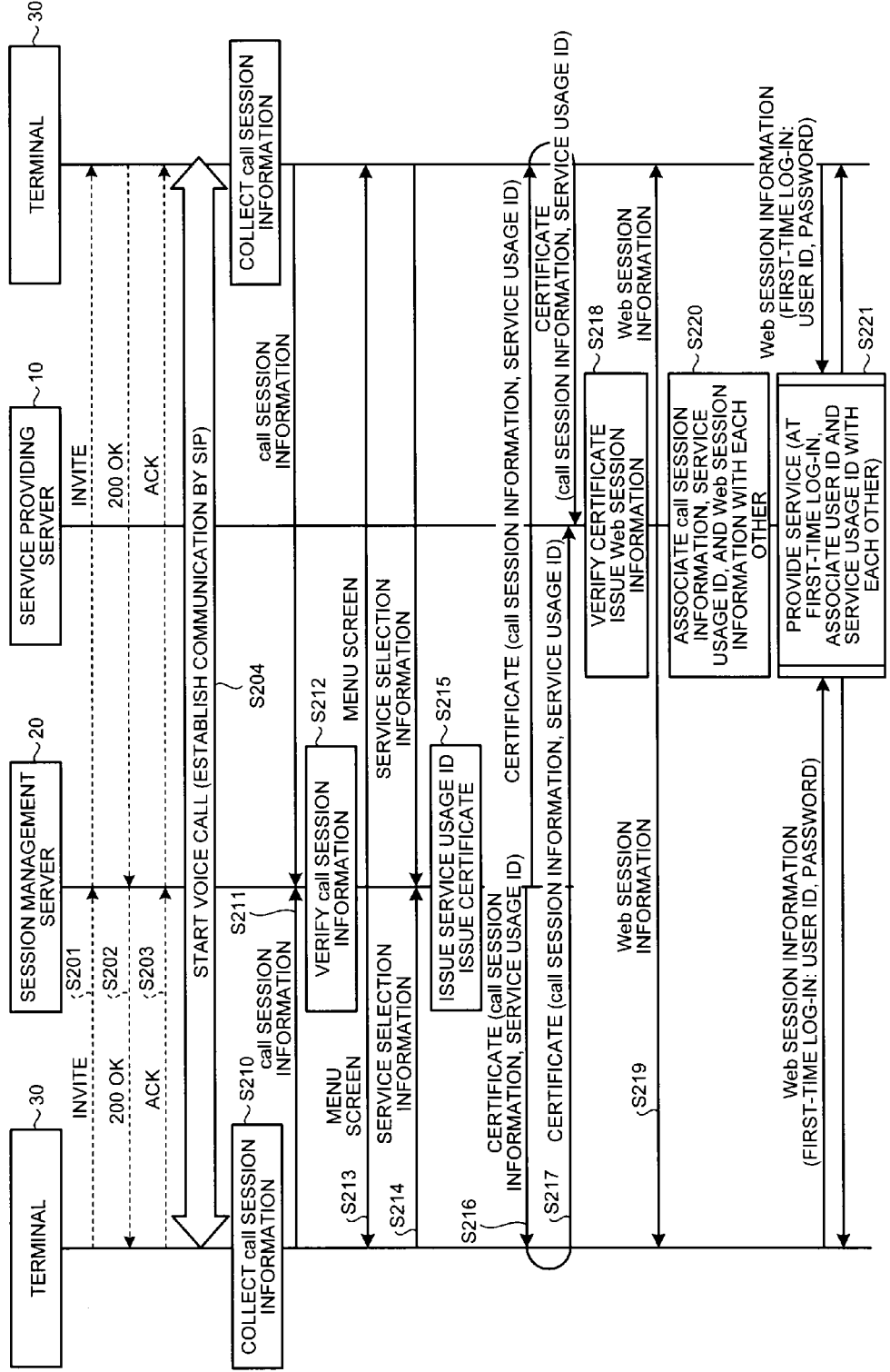
FIG. 18 is a sequence diagram showing a processing procedure of the service providing system according to the second embodiment.
Figure 19:
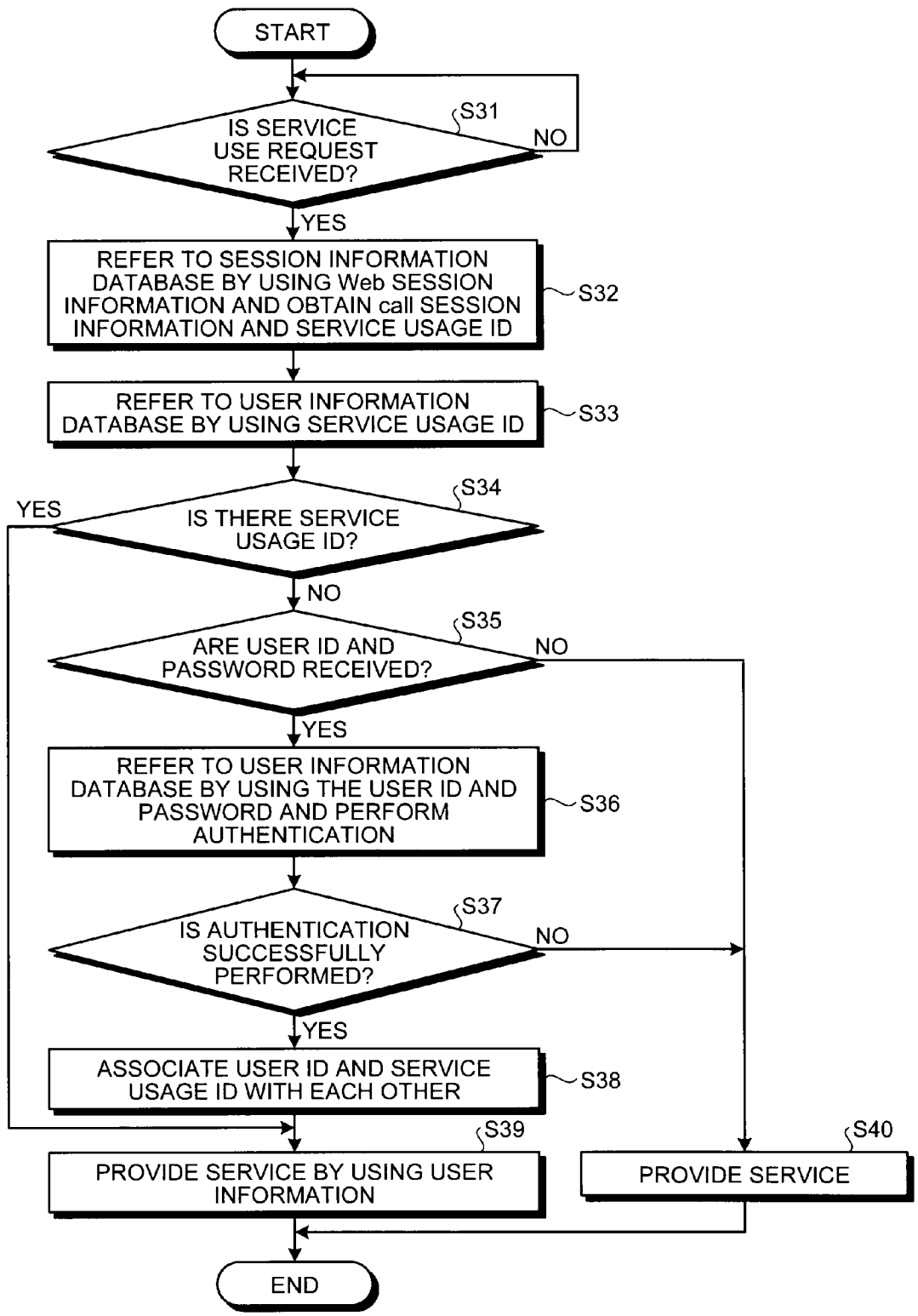
FIG. 19 is a flowchart showing a processing procedure of a service providing unit.
Figure 20:
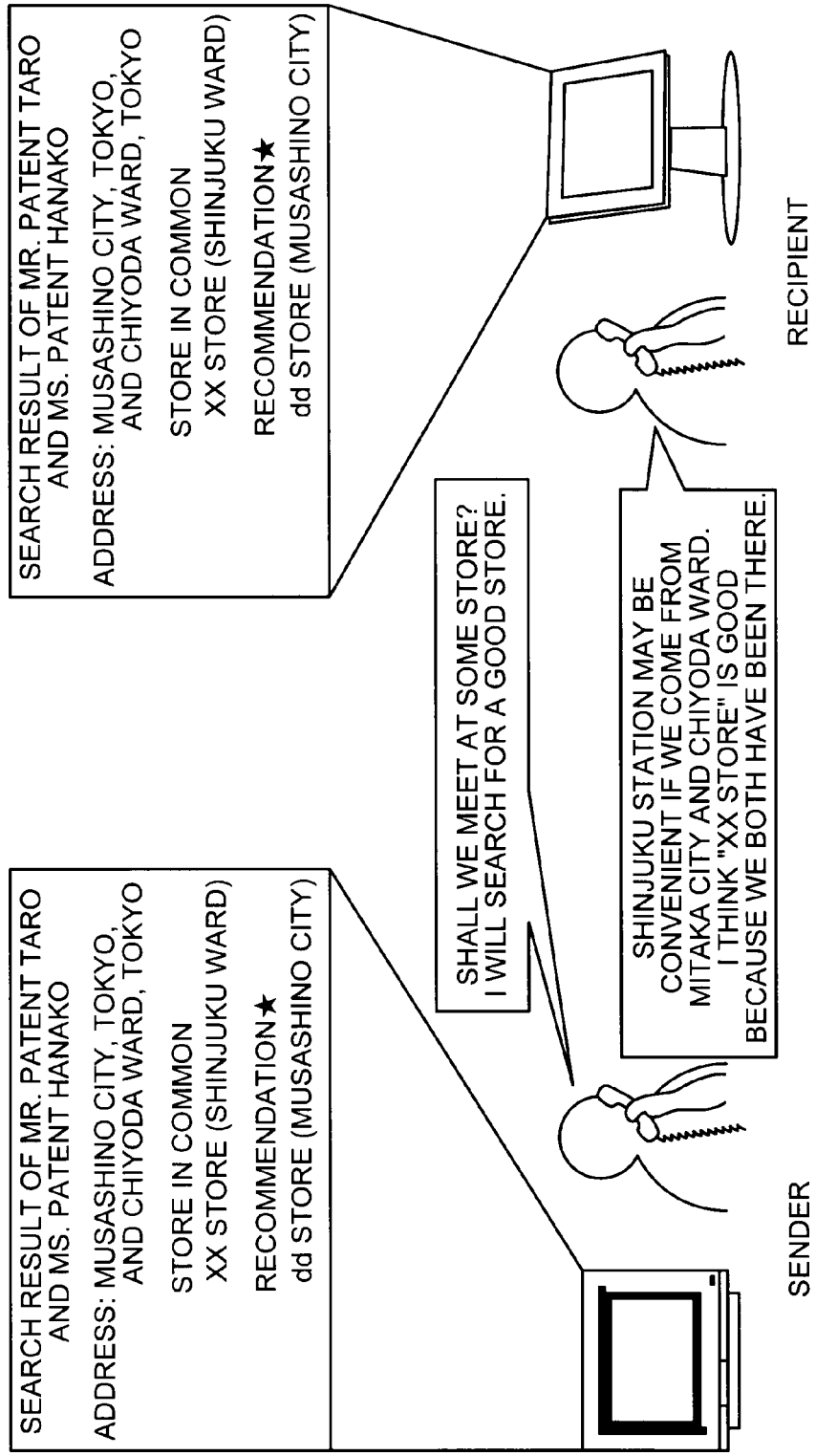
FIG. 20 is a diagram for explaining a service providing screen.

Next, a processing procedure of the service providing system according to the second embodiment will be described with reference to FIGS. 18 to 20. FIG. 18 is a sequence diagram showing the processing procedure of the service providing system according to the second embodiment. FIG. 19 is a flowchart showing a processing procedure of the service providing unit. FIG. 20 is a diagram for explaining a service providing screen.

Steps S201 to S220 in the processing procedure shown in FIG. 18 correspond to steps S101 to S120 in the processing procedure of the service providing system according to the first embodiment. In the service providing system according to the second embodiment, only the processing in step 221 is different from the first embodiment.

Specifically, in step S221, the service use unit 34 of the terminal 30 accesses the service providing server 10 with the Web session information in the same manner as in the first embodiment. Of course, the service use unit 34 of the second embodiment performs a log-in operation, in which a user ID and a password are transmitted, when using the service for the first time. The log-in operation is not limited to a method in which a user ID and a password are transmitted, but, for example, a method in which a public key certificate is transmitted may be used.

When a first log-in operation is performed, the service providing unit 16 of the service providing server 10 refers to the user information database 17 by using the user ID and the password transmitted from the terminal 30, and authenticates the user of the terminal 30. When the authentication is successfully performed, the service providing server 16 associates the user ID and the service usage ID with each other by storing the service usage ID in association with the user information of the user information database 17.

After the first time, the service use unit 34 of the terminal 30 need not perform the log-in operation. Specifically, if the service providing unit 16 of the service providing server 10 refers to the user information database 17 by using the service usage ID, the service providing unit 16 can identify the user information stored in association with the service usage ID. Therefore, the service providing unit 16 provides a service by using the user information of the user ID.

[Processing Procedure of Service Providing Unit]

Next, step S221 shown in FIG. 18 will be described in detail with reference to FIG. 19.

First, the service providing unit 16 of the service providing server 10 determines whether or not a service use request is received (step S31), and when the service use request is not received (No in step S31), the service providing unit 16 repeatedly performs the processing for determining whether or not the service use request is received.

On the other hand, when the service use request is received (Yes in step S31), the service providing unit 16 refers to the session information database 11 by using the Web session information, and obtains the call session information and the service usage ID (step S32).

Then, the service providing unit 16 refers to the user information database 17 by using the service usage ID (step S33), and when the service usage ID cannot be detected (No in step S34), the service providing unit 16 determines whether or not a user ID and a password are received from the terminal 30 (step S35).

When a user ID and a password are received (Yes in step S35), the service providing unit 16 refers to the user information database 17 by using the user ID and the password, and performs the authentication (step S36).

Then, the service providing unit 16 determines whether or not the authentication is successfully performed (step S37), and when the authentication is successfully performed (Yes in step S37), the service providing unit 16 associates the user ID and the service usage ID with each other by storing the service usage ID obtained in step S32 in association with the user ID.

Subsequently, the service providing unit 16 provides a service by using the user information of the user ID (step S39), and ends the processing.

By the way, when the service usage ID can be detected in step S34 (Yes in step S34), it is not the first time, so that the service providing unit 16 identifies the user ID stored in association with the service usage ID, provides a service by using the user information of the user ID (step S39), and ends the processing.

When a user ID and a password are not received from the terminal 30 in step S35 (No in step S35), or when the authentication fails in step S37 (No in step S37), the service providing unit 16 provides a service without using user information (step S40), and ends the processing.

Here, a case example in which a service is provided by using the user information will be described. The service providing unit 16 of the service providing server 10 searches the user information database 17 by using the service usage ID "USER1-web1-SP-id" transmitted from a certain terminal 30, and thereby identifies that the user of the terminal 30 is the user ID "myuser@web1.sp1.com" registered in the service providing server 10 as a member in advance.

In the same way, the service providing unit 16 searches the user information database 17 by using the service usage ID "USER3-web1-SP-id" transmitted from a certain terminal 30, and thereby identifies that the user of the terminal 30 is the user ID "ouruser@web1.sp1.com" registered in the service providing server 10 as a member in advance.

The service providing unit 16 refers to the session information database 11 by using the Web session information transmitted from the terminal 30 and obtains the call session information and the service usage ID, and thereby grasps that the service provided to the user ID "myuser@web1.sp1.com" and the service provided to the user ID "ouruser@web1.sp1.com" are associated with each other.

Here, as shown in FIG. 20, it is assumed that the service provided by the service providing unit 16 is a store search service. The service providing unit 16 uses the user information indicating that the address of the user ID "myuser@web1.sp1.com" is " . . . , Musashino City, Tokyo" and the address of the user ID "ouruser@web1.sp1.com" is " . . . , Chiyoda Ward, Tokyo", and thereby introduces a store located in "Shinjuku Ward" which is in the center of the above addresses.

The service providing unit 16 displays a name "Patent Taro" of the user ID "myuser@web1.sp1.com" and a name "Patent Hanako" of the user ID "ouruser@web1.sp1.com" on a screen on which the service is provided.

Effects of Second Embodiment

As described above, according to the service providing system of the second embodiment, it is possible to provide a high-value-added Web service by associating with the user information registered as a member in advance.

For example, the service providing server 10 uses the user information indicating that the address of the user ID "myuser@web1.sp1.com" is " . . . , Musashino City, Tokyo" and the address of the user ID "ouruser@web1.sp1.com" is " . . . , Chiyoda Ward, Tokyo", and thereby can introduce a store located in "Shinjuku Ward" which is in the center of the above addresses.

According to the second embodiment, a user can use SSO (Single Sign On) by only performing a first log-in operation, and the user can use services as a user of an existing Web service.

Third Embodiment

So far, as the second embodiment, a case example in which the service providing server 10 stores the user information and the service usage ID in association with each other and provides a Web service by using the user information has been described. However, the present invention is not limited to this. The present invention can be also applied to a case example in which the session management server 20 associates the user information and the service usage ID with each other. Hereinafter, the case example to which the present invention is applied will be described as a third embodiment.

Outline of Service Providing System According to Third Embodiment

Figure 21:
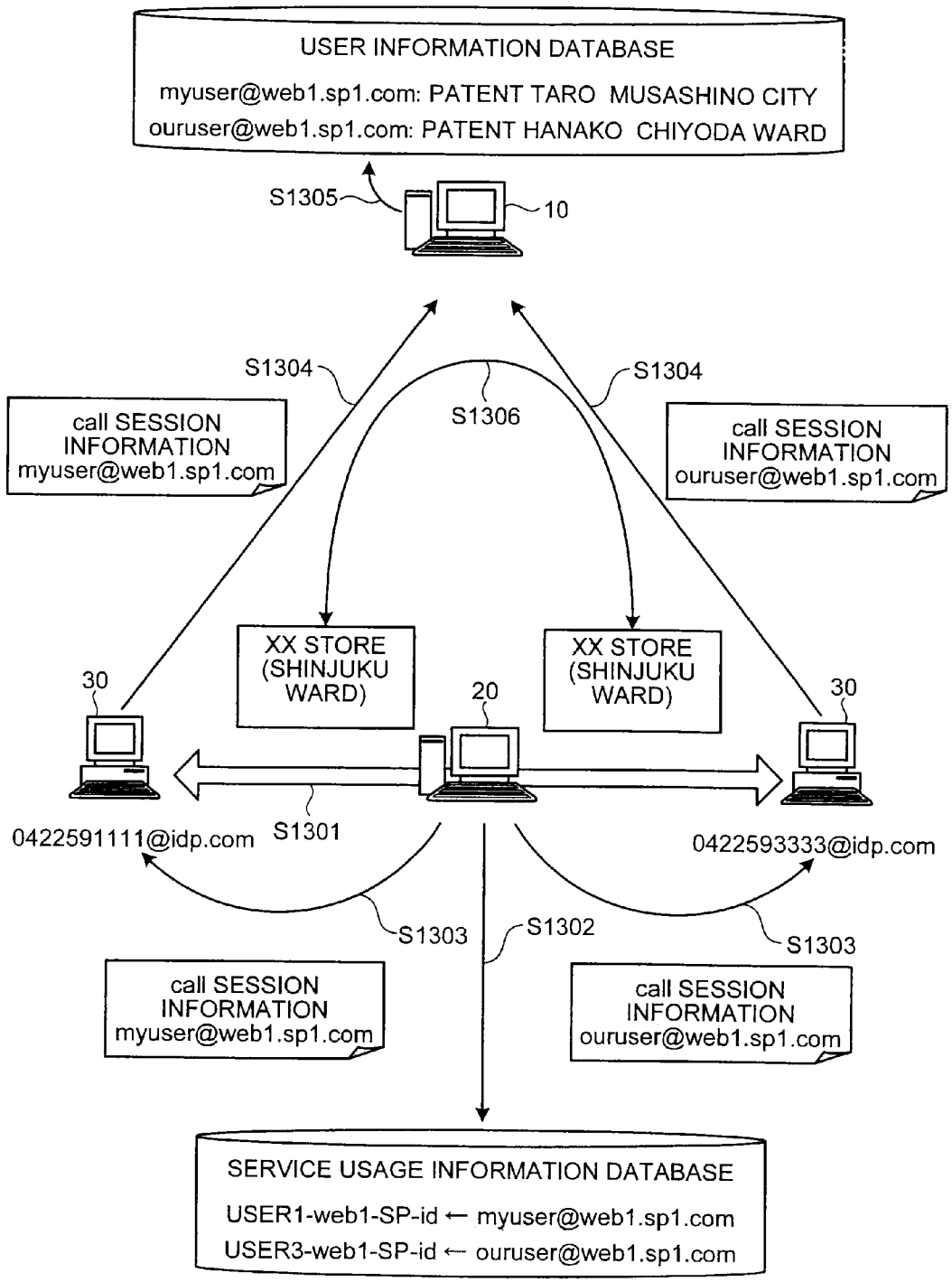
FIG. 21 is a diagram for explaining an outline of a service providing system according to a third embodiment.

First, an outline of the service providing system according to the third embodiment will be described with reference to FIG. 21. FIG. 21 is a diagram for explaining the outline of the service providing system according to the third embodiment.

As shown in FIG. 21, the service providing system according to the third embodiment includes a service usage information database in which the session management server 20 stores user information related to a user registered in the service providing server 10 as a member in advance and the service usage ID in association with each other. Although the service providing server 10 provides a service by using the user information in the same manner as in the second embodiment, it is because the user ID is included in the certificate issued by the session management server 20.

Specifically, in the same manner as in the second embodiment, first, a communication is established between the terminals 30 by the SIP, and then a voice call is started between the terminals 30 (step S1301).

Next, in the same manner as in the second embodiment, the session management server 20 issues a certificate to each terminal 30. However, different from the second embodiment, the session management server 20 refers to the service usage information database by using the service usage ID, searches for the user ID (step S1302), and issues a certificate including the call session information and the user ID (step S1303).

Although not shown in FIG. 21, when a Web service is used for the first time, the session management server 20 issues a certificate including only the call session information, and each terminal 30 performs a log-in operation. Then, the service providing server 10 performs authentication on each terminal 30, and when the authentication is successfully performed, the service providing server 10 transmits the user ID to the session management server 20. At this time, the session management server 20 stores the service usage ID and the user ID in association with each other into the service usage information database, so that, after the first time, the session management server 20 can issue a certificate including the call session information and the user ID.

Each terminal 30 transmits the certificate issued from the session management server 20 and a service use request to the service providing server 10 (step S1304).

On the other hand, when the service providing server 10 receives the certificate from the terminal 30 after the first time, the service providing server 10 refers to the user information database by using the user ID included in the certificate, and searches for the user information (step S1305).

Then, in the same manner as in the second embodiment, the service providing server 10 identifies that the call session information pieces transmitted from each terminal 30 are call session information pieces indicating the same communication, makes Web services provided to each terminal 30 cooperate with each other, and controls the service provision so that each service is provided according to the searched user information (step S1306).

Based on this, according to the service providing system of the third embodiment, the service providing server 10 need not manage the service usage ID, so that a high-value-added Web service can be provided without changing the service providing server 10.

Configuration of Service Providing System According to Third Embodiment

Figures 22, 23:
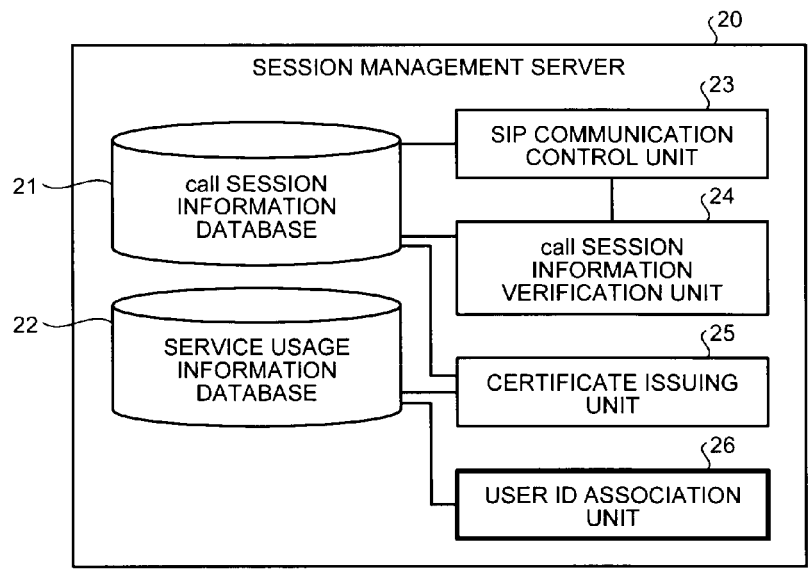
FIG. 22 is a block diagram showing a configuration of a session management server.
FIG. 23 is a diagram for explaining a service usage information database.

Next, a configuration of the service providing system according to the third embodiment will be described with reference to FIGS. 22 to 26. FIG. 22 is a block diagram showing a configuration of the session management server. FIG. 23 is a diagram for explaining the service usage information database. FIG. 24 is a diagram for explaining the certificate. FIG. 25 is a diagram for explaining the session information database. FIG. 26 is a diagram for explaining the user information database. Hereinafter, only a configuration of the service providing system according to the third embodiment, which is different from that according to the first embodiment and the second embodiment, will be described.

As shown in FIG. 22, the session management server 20 according to the third embodiment further includes a user ID association unit 26.

The user ID association unit 26 associates the service usage ID and the user ID with each other. Specifically, when the user ID is transmitted to the user ID association unit 26 from the service providing server 10 by being redirected by the terminal 30, the user ID association unit 26 stores the service usage ID of the terminal 30 that has redirected the user ID and the transmitted user ID in association with each other into the service usage information database 22. For example, as shown in FIG. 23, the user ID association unit 26 stores the user ID in association with the service usage ID.

In the same manner as in the first embodiment and the second embodiment, the certificate issuing unit 25 issues a service usage ID and issues a certificate, however, different from the first embodiment and the second embodiment, the certificate issuing unit 25 issues either a certificate including only the call session information or a certificate including the call session information and the user ID. Specifically, the certificate issuing unit 25 refers to the service usage information database 22 and searches for the user ID stored in association with the service usage ID. When the user ID can be detected, the certificate issuing unit 25 issues a certificate including the call session information and the user ID. On the other hand, when the user ID cannot be detected, the certificate issuing unit 25 issues a certificate including only the call session information.

For example, as shown in FIG. 24, the certificate issuing unit 25 issues a certificate including the call session information and the user ID. In FIG. 24, the certificate issuing unit 25 further adds the service usage ID to the certificate. Even when the service usage ID is included in the certificate, the service providing server 10 which receives the certificate may not use the service usage ID. Specifically, if there are a plurality of service providing servers 10, the service providing servers 10 that manage a user by using the service usage ID and the service providing servers 10 that do not use the service usage ID may coexist. To cope with such a situation, it is desirable that the service usage ID is included in the certificate and the service providing server 10 determines whether or not to use the service usage ID.

Different from the first embodiment and the second embodiment, the session information database 11 of the service providing server 10 according to the third embodiment stores the call session information, the user ID, and the Web session information in association with each other. For example, the session information database 11 stores information as shown in FIG. 25.

Different from the second embodiment, the user information database 17 according to the third embodiment does not store the service usage ID in association with the user information. For example, the user information database 17 stores information as shown in FIG. 26.

In the same manner as in the second embodiment, the service providing unit 16 according to the third embodiment provides a service in association with the user information, however, different from the second embodiment, the service providing unit 16 does not use the service usage ID. Specifically, in the third embodiment, the certificate verification unit 14 receives a certificate including the call session information and the user ID from the terminal 30, and the Web session information issuing unit 15 stores the call session information, the user ID, and the Web session information in association with each other into the session information database 11.

Therefore, when providing a service, the service providing unit 16 according to the third embodiment refers to the session information database 11 by using the Web session information, and obtains the call session information and the user ID. The service providing unit 16 refers to the user information database 17 by using the user ID, and obtains the user information stored in association with the user ID. The service providing unit 16 controls the service provision so that services are provided to the terminal 30 in accordance with the user information.

Figure 27:
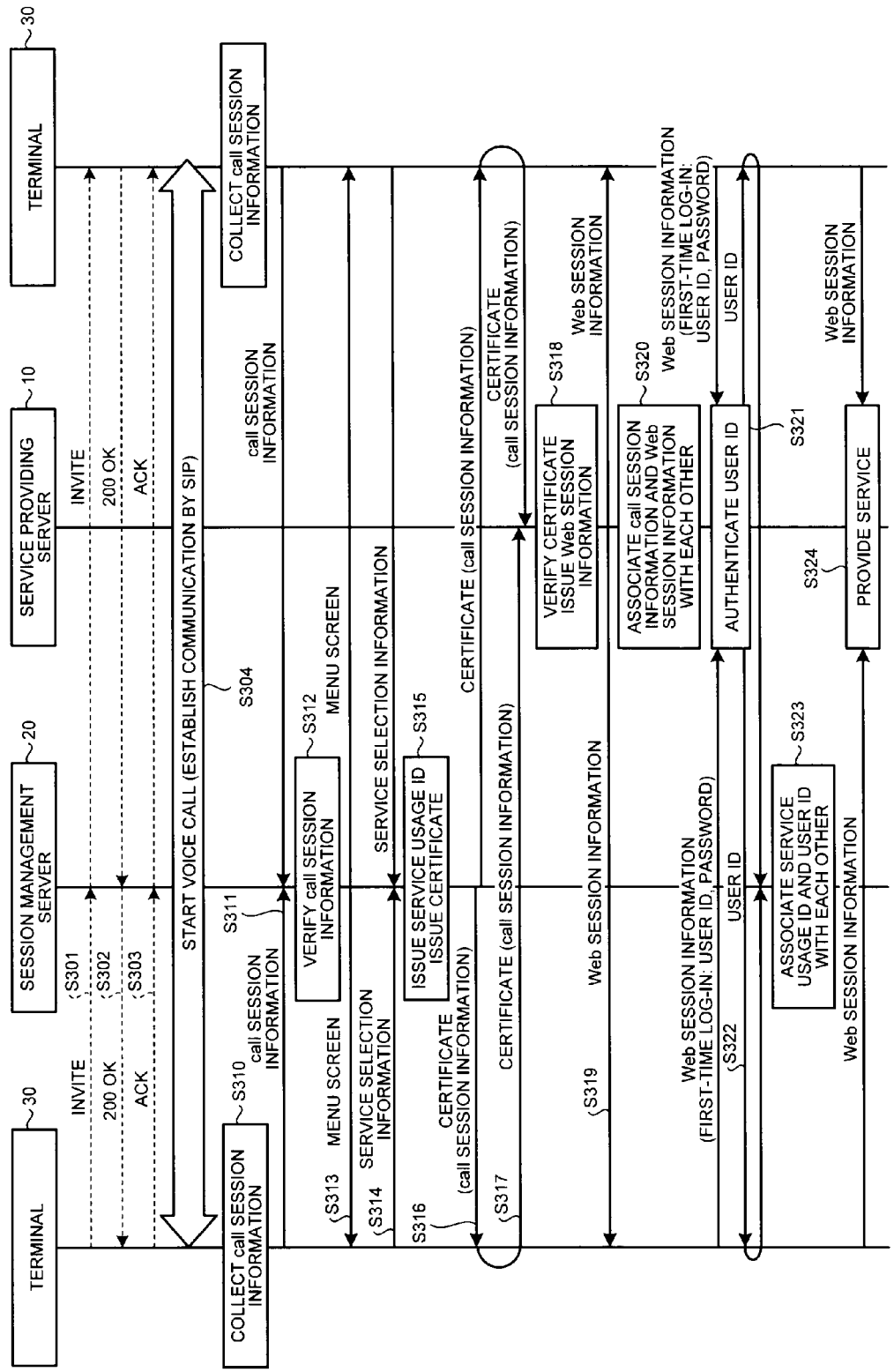
FIG. 27 is a sequence diagram showing a processing procedure of the service providing system according to the third embodiment.
Figure 28:
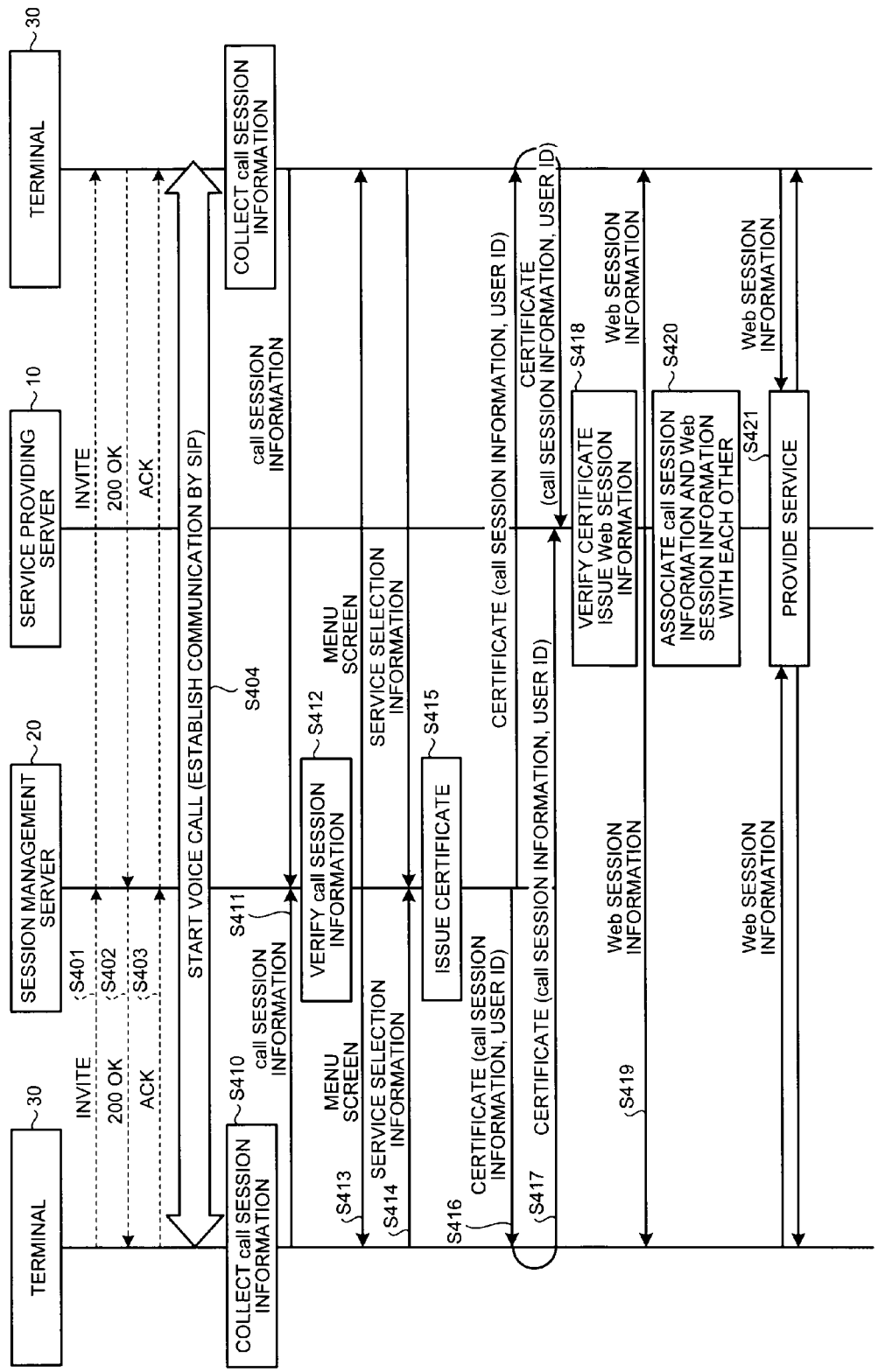
FIG. 28 is a sequence diagram showing a processing procedure of the service providing system according to the third embodiment.
Figure 29:
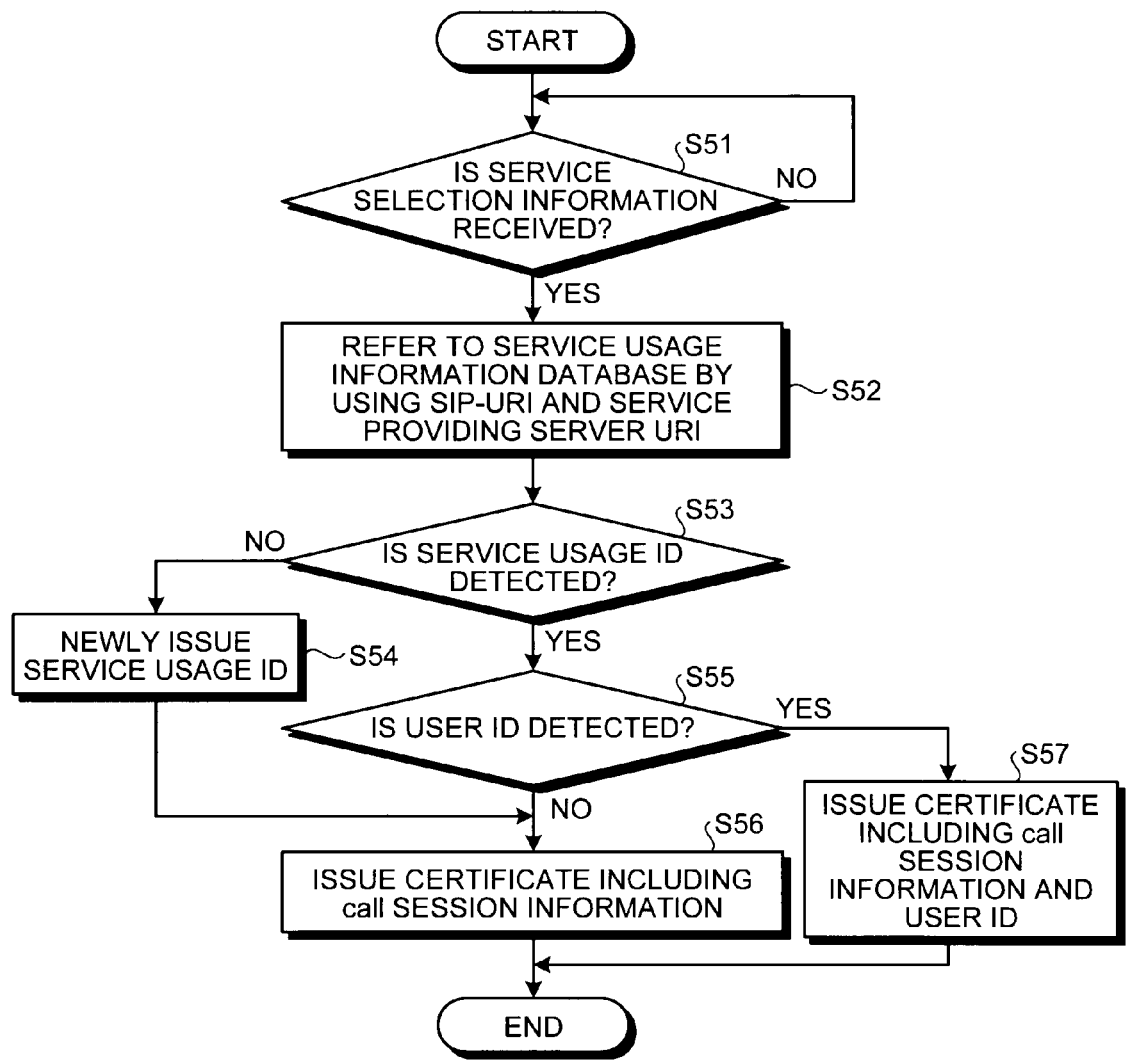
FIG. 29 is a flowchart showing a processing procedure of a certificate issuing unit.

Processing Procedure of the Service Providing System According to Third Embodiment Next, a processing procedure of the service providing system according to the third embodiment will be described with reference to FIGS. 27 to 29. FIGS. 27 and 28 are sequence diagrams showing the processing procedure of the service providing system according to the third embodiment. FIG. 29 is a flowchart showing a processing procedure of the certificate issuing unit. FIG. 27 shows a processing procedure when the first log-in is performed, and FIG. 28 shows a processing procedure when the second and the following log-ins are performed.

Steps S301 to S320 in the processing procedure shown in FIG. 27 correspond to steps S101 to S120 in the processing procedure of the service providing system according to the first embodiment. However, in the service providing system according to the third embodiment, the processing of step 315 is different from the first embodiment. Also, the processing of step S321 and the following steps is different from the first embodiment.

Steps S401 to S421 in the processing procedure shown in FIG. 28 correspond to steps S101 to S121 in the processing procedure of the service providing system according to the first embodiment. However, in the service providing system according to the third embodiment, the certificate issued in step S415 is different from that of the first embodiment. Therefore, in step S416 and the following steps, information used by each unit is different from that of the first embodiment.

First, step S315 shown in FIG. 27 will be described in detail with reference to FIG. 29. The certificate issuing unit 25 of the session management server 20 determines whether or not the service selection information is received from the terminal 30 (step S51), and when the service selection information is not received (No in step S51), the certificate issuing unit 25 repeatedly performs the processing for determining whether or not the service selection information is received.

On the other hand, when the service selection information is received (Yes in step S51), the certificate issuing unit 25 refers to the service usage information database 22 by using the SIP-URI that uniquely identifies the terminal 30 and the service providing server URI that uniquely identifies the service indicated by the service selection information (step S52).

When the certificate issuing unit 25 cannot detect the service usage ID (No in step S53), the certificate issuing unit 25 newly issues a service usage ID (step S54), issues a certificate that includes only the call session information (step S56), and ends the processing.

On the other hand, when the certificate issuing unit 25 can detect the service usage ID (Yes in step S53), the certificate issuing unit 25 searches the user ID (step S55). When the user ID cannot be detected (No in step S55), the certificate issuing unit 25 issues a certificate that includes only the call session information (step S56), and ends the processing.

On the other hand, when the user ID can be detected (Yes in step S55), the certificate issuing unit 25 issues a certificate that includes the call session information and the user ID (step S57), and ends the processing.

Return to FIG. 27. Since FIG. 27 is a sequence diagram showing a processing procedure when the first log-in operation is performed, it is assumed that the service usage ID cannot be detected in step S53 shown in FIG. 29 or the user ID cannot be detected in step S55. Therefore, in step S315 shown in FIG. 27, the certificate issuing unit 25 issues a certificate that includes only the call session information.

In step S321, the service use unit 34 of the third embodiment performs a log-in operation in which a user ID and a password are transmitted.

When the first log-in operation is performed, the service providing unit 16 of the service providing server 10 refers to the user information database 17 by using the user ID and the password transmitted from the terminal 30, and authenticates the user of the terminal 30. When the authentication is successfully performed, different from the second embodiment, the service providing server 16 transmits the user ID to the session management server 20 (step S322). At this time, the user ID is redirected by the terminal 30 and transmitted to the session management server 20.

Then when the user ID is transmitted to the user ID association unit 26 of the session management server 20 from the service providing server 10 by being redirected by the terminal 30, the user ID association unit 26 stores the service usage ID of the terminal 30 that has redirected the user ID and the transmitted user ID in association with each other into the service usage information database 22 (step S323). At this time, the user ID association unit 26 recognizes that the access in step S314 and the access in step S322 are the same communication by some sort of method. For example, the user ID association unit 26 can recognize that the access in step S314 and the access in step S322 are the same communication by using session information provided to the HTTP communication of the terminal 30 from the session management server 20. Also, for example, the user ID association unit 26 can recognize that the access in step S314 and the access in step S322 are the same communication if the certificate in step S317 includes the service usage ID and the service providing server 10 attaches the service usage ID included in the certificate to the user ID when transmitting the user ID in step S322.

On the other hand, the service providing unit 16 of the service providing server provides a service by using the user information of the user ID (step S324).

Since FIG. 28 is a sequence diagram showing a processing procedure when the second and the following log-ins are performed, it is assumed that the service usage ID can be detected in step S53 shown in FIG. 29 and the user ID can be detected in step S55. Therefore, in step S415 shown in FIG. 28, the certificate issuing unit 25 issues a certificate that includes the call session information and the user ID.

Then, in step S417, the service providing unit 16 of the service providing server 10 receives a certificate including the call session information and the user ID from the terminal 30, and, in step S420, the Web session information issuing unit 15 stores the call session information, the user ID, and the Web session information in association with each other into the session information database 11.

Therefore, when the service providing unit 16 provides a service in step S421, the service providing unit 16 refers to the user information database 17 by using the user ID, obtains the user information stored in association with the user ID, and provides a service to the terminal 30 by using the user information.

Effects of Third Embodiment

As described above, according to the service providing system of the third embodiment, the service providing server 10 need not manage the service usage ID, so that a high-value-added Web service can be provided without changing the databases of the service providing server 10.

In addition, according to the third embodiment, a user can use Single Sign On (SSO) by only performing the first log-in operation, and the user can use services as a user of an existing Web service.

Fourth Embodiment

Other Embodiments

Although the first to the third embodiments of the present invention have been described above, the present invention may be implemented in various different forms other than the embodiments described above.

[Service Usage ID]

In the first to the third embodiments, the method is described in which "USER1-web1-SP-id" or the like or a random number is used as the service usage ID. However, the present invention is not limited to this. For example, as shown in FIG. 30, information of HTTP-URI format may be used as the service usage ID.

When the information of HTTP-URI format is used as the service usage ID, the service providing server 10 can access another server by using the HTTP-URI, collect other user information related to the terminal 30 (or the user of the terminal 30), and provide a more high-value-added Web service by using the collected user information.

In the first to the third embodiments, the service usage ID is issued for each combination of a terminal and a service. However, the present invention is not limited to this, and the service usage ID is not necessarily has to be issued for each combination of a terminal and a service if the service usage ID is information by which the service providing server 10 can identify the terminal.

[Exchange of User Information]

In the first to the third embodiments, a method has been described in which the service providing server 10 provides a Web service by using the history information accumulated in the service providing server 10 or the user information registered in advance. However, the present invention is not limited to this, and the user information may be transmitted from the session management server 20 to the service providing server 10.

For example, if the session management server 20 registers address, name, age, place-name, near station, Global Positioning System (GPS) information, post code, and the like in advance as the user information of the terminal 30, the session management server 20 may properly include these user information pieces in a certificate to be issued. Then, the service providing server 10 can obtain the user information in association with the service usage ID included in the certificate, and provide a Web service by using the obtained user information.

The session management server 20 may ask a user of the terminal 30 whether or not the user information may be included in the certificate. If the session management server 20 registers in advance only information of HTTP-URI format as the user information of the terminal 30, the session management server 20 may access another server by using the HTTP-URI if allowed by a user, and collect the user information.

On the contrary, the user information may be transmitted from the service providing server 10 to the session management server 20. Specifically, if the service providing server 10 transmits the user information collected in advance to the session management server 20, for example, when the terminal 30 accesses other service providing server 10 via the session management server 20, the user information received by the session management server 20 can be used, and a Web service can be provided by using the user information of the other service providing server 10.

[Selection of Communication Protocol]

Although, in the first to the third embodiments, it is assumed that the first communication is communication established by the SIP and the second communication is HTTP communication, the present invention is not limited to this. Any communication protocol can be used if the session established by the first communication and the session of the second communication are different from each other.

[Call Session Information]

In the first to the third embodiments, it is described that the call session information obtained by the service providing server 10 has the same value, however, the call session information may not have the same value. The call session information may be a combination of two values or the like if the service providing device can uniquely identify the same communication established by the SIP between the terminals 30 by the call session information.

[Inquiry]

In the first to the third embodiments, the session management server 20 issues the call session information and the service usage ID as a certificate, so that the service providing server 10 confirms that the call session information and the service usage ID are reliable information by verifying the certificate. However, the present invention is not limited to this. For example, it is assumed that session management server 20 does not issue the call session information and the service usage ID as a certificate but issues the call session information and the service usage ID without change. When the service providing server 10 receives these information pieces from the terminal 30, for example, the service providing server 10 may inquire the session management server 20 whether the call session information and the service usage ID are reliable information.

[System Configuration or the Like]

In the first to the third embodiments, a method has been described in which the service providing server 10 provides a service to the terminal 30 that integrally includes an SIP communication function and an HTTP communication function. However, the present invention is not limited to these embodiments. The present invention can also be applied to a system in which the SIP communication function and the HTTP communication function are respectively included in different terminals (a system which includes an SIP phone including the SIP communication function and an information display terminal including the HTTP communication function) and a system which includes a plurality of SIP phones and a plurality of information display terminals. In both systems mentioned above, a device which performs information transmission between an SIP phone and an information display terminal and identifies an information display terminal to which a service is provided is considered to be additionally required, and for example, a device such as a Home GateWay (HGW) may play the role of the device mentioned above.

For example, each HGW provides browser session information in advance to an information display terminal connected under control of the HGW and stores the browser session information and an SIP phone ID that identifies the SIP phone in association with each other. Under such a configuration, after communication is established between SIP phones by the SIP, each HGW collects the call session information and the SIP phone IDs. Then each HGW detects the browser session information from the SIP phone ID and identifies an information display terminal polling by using the detected browser session information, and thereby identifies an information display terminal used in combination with the SIP phones that have established communication. In this way, each HGW may transmit the call session information to the identification information displayed terminal and redirect to the session management server.

If the SIP phone includes a function corresponding to that of a Web server, the HGW is not necessary. For example, each SIP phone may collect the call session information from the communication established by the SIP, and each information display terminal may poll an SIP phone including a function corresponding to that of a Web server to obtain the call session information from the SIP phone, and then transmit the obtained call session information to the session management server.

A configuration of the transmitting side and a configuration of the receiving side may be different from each other.

In the first to the third embodiments, a case example has been described in which the service providing server 10 associates the Web services provided to the terminals 30 with each other. However, the present invention is not limited to this. The present invention can be also applied to a case example in which the service providing server 10 provides a Web service to the terminal 30 corresponding to an ad hoc communication relationship between the service providing server 10 and the terminal 30.

Specifically, the service providing server 10 collects the call session information that identifies a communication established between the service providing server 10 and the terminal 30 from each terminal 30. The service providing server 10 also collects the service usage ID that identifies the terminal 30 or the user ID that identifies the user of the terminal 30 from each terminal 30 as information of a combination with the call session information. The service providing server 10 identifies the call session information that indicates a communication established between the service providing server 10 and the terminal 30 from a plurality of call session information pieces, and, when providing a service to the terminal 30 that has established the communication identified by the identified call session information, the service providing server 10 identifies the service usage ID (or user ID) that identify the terminal 30 or the user of the terminal 30 from a plurality of service usage IDs (or user IDs). Then, the service providing server 10 provides a service by using the history information or the user information stored in the storage unit in association with the identified service usage ID (or user ID).

For example, the session management server 20 issues a certificate to only the terminal 30, and the terminal 30 transmits the certificate to the service providing server 10. Since the service providing server 10 collects the call session information in the service providing server 10, the service providing server 10 verifies the call session information included in the certificate transmitted from the terminal 30 and the call session information collected in the service providing server 10. If the verification is successfully performed, the service providing server 10 issues Web session information and associates the call session information, the service usage ID, and the Web session information with each other. Thereafter, the service providing server 10 provides a service by using the history information and the user information in the same manner as in the first to the third embodiments.

For example, as shown in FIG. 31, a concierge service in which a recipient recommends a store or goods on the basis of a request of a sender can be implemented. The service providing server 10 stores the history information of Mr. Patent Taro (information of stores that have been used by Mr. Patent Taro, and the like). When a sender (myuser@web1.sp1.com) makes a call, information of stores that have been used by the sender and recommended information based on the service usage ID of the sender are displayed on a screen of an operator who is the recipient as shown in the right of FIG. 31. The operator can estimate favorites of the user from this information and recommend information suitable to the sender as shown in the left of FIG. 31 by pressing a transmission button.

In the embodiments described above, although a case example in which the session management server 20 and an SIP server are implemented in the same device has been described, the present invention is not limited to this. The session management server 20 may be a device different from the SIP server. In this case, the communication between the terminals 30 is established by an SIP server different from the session management server 20, and the call session information that identifies the established communication is collected by the session management server 20.

When the session management server 20 is a device different from the SIP server, for example, the call session information verification unit 24 of the session management server 20 communicates with the SIP server and transmits and receives necessary information, and thereby the verification processing of the call session information verification unit 24 is implemented. For example, the verification processing is implemented by using "Parlay X" which is a standardized Application Programming Interface (API).

FIG. 32 is a diagram for explaining an example in which communication between the session management server and the SIP server is implemented by using Parlay X. Steps S101 to S104 and steps S110 to S112 shown in FIG. 32 correspond to steps S101 to S104 and steps S110 to S112 described with reference to FIG. 12. Although the description of steps S131 to S133 shown in FIG. 32 is omitted in FIG. 12, these steps are processing procedure for disconnecting the communication established between the terminals 30 by the SIP. Steps S113 to S121 described with reference to FIG. 12 are omitted in FIG. 32.

Here, steps S1 to S4 shown in FIG. 32 are processing procedure of the verification processing of the call session information verification unit 24. As shown in step S1, the session management server 20 registers a recipient in an SIP server 40 in advance. Specifically, the SIP server 40 transmits notification of step 2 described below to the session management server 20 only for users registered in the SIP server 40 in advance.

For example, when receiving a contract for participating in the service providing system and accepting a user registration, the session management server 20 registers the URI of the user in the SIP server 40. In an example which uses "Parlay X", the session management server 20 transmits "startCallNotification" with the URI of the recipient as an argument to the SIP server 40. The "startCallNotification" is call session information related to the specified URI of the recipient. As the URI, SIP-URI, a telephone number, and the like can be used. Although the registration in step S1 needs to be performed before the communication is established in step S104, the registration need not be performed as processing continued to a series of processing starting from step S101. Specifically, for example, even if the registration in step S1 was performed a year ago, if a corresponding communication is established now for the first time, the notification in step S2 by the SIP server 40 is performed.

As described above, regarding a user registered in the SIP server 40 in step S1, when communication whose recipient is the user is established, the SIP server 40 notifies the session management server 20 that the communication is established as shown in step S2. In an example which uses "Parlay X", the SIP server 40 transmits "notifyAnswer" with a URI of a sender, the URI of the recipient, and the call session information of the established communication as arguments to the session management server 20. The "notifyAnswer" is a call session information notification when communication is established. Then, when the call session information verification unit 24 verifies the call session information in step S112, the call session information verification unit 24 verifies whether or not the call session information is the call session information received in step S2.

Thereafter, as shown in step S3, the session management server 20 can check a state of the communication established in step S104 by sending an inquiry to the SIP server 40 by polling or the like. In an example which uses "Parlay X", the session management server 20 transmits "getCallSessionInformation" with the call session information as an argument to the SIP server 40, and receives a state of the communication as a response to the "getCallSessionInformation". The "getCallSessionInformation" is an acquisition of a session state (during call, end of the call, and the like) related to a call session information identifier. For example, if the communication is disconnected as shown in steps S131 to S133, the SIP server 40 transmits a state indicating that the communication is disconnected as a response to the inquiry shown in step S4.

In this way, when the session management server 20 receives the state indicating that the communication established by the SIP is disconnected along with the call session information, for example, the session management server 20 can perform control so that the service provision corresponding to the call session information ends. For example, the session management server 20 can perform control so that the service being provided in step S121 in FIG. 12 ends. Also, for example, the session management server 20 can issue a redirect instruction to change an access destination of the terminal 30, the service provision to which is controlled to end, to a predetermined URL.

The processing procedure described with reference to FIG. 32 is just an example, and the communication can be implemented by arbitrarily replacing the "Parlay X" with another API. For example, in the example described above, in step S1, the registration of the recipient is performed in advance, and in step S2, the call session information request related to the URI of the recipient is transmitted. However, the processing procedure is not limited to this, and for example, if the API that replaces the "Parlay X" has a specification compatible with the call session information request related to URI of not only the recipient but also the sender, the registration in step S1 may be performed not only for the recipient but also for the sender. Also, for example, if the API that replaces the "Parlay X" has a specification in which, when it is detected that the communication is disconnected, the API automatically transmits a state indicating that the communication is disconnected to the session management server 20, the session management server 20 need not repeatedly send an inquiry as performed in step S3.

The processing procedures (FIGS. 12 to 14, FIGS. 18 and 19, and FIGS. 27 to 29), specific names, information that includes various data and parameters shown in this description and the drawings can be arbitrarily changed unless otherwise stated.

The constituent elements of the devices shown in the drawings are functionally conceptual, and need not necessarily be physically configured as shown in the drawings. In other words, specific forms of distribution and integration of the devices are not limited to those illustrated in the drawings, and all or part of the devices can be functionally or physically distributed or integrated in arbitrary units according to various loads and the state of use. Moreover, all or an arbitrary part of the processing functions performed in each device can be realized by a CPU and a program analyzed and executed by the CPU, or can be realized as hardware by wired logic.

The service providing method described in the embodiments may be achieved by causing a computer such as a personal computer or a workstation to execute a program prepared in advance. The program can be distributed via a network such as the Internet. The program can be stored in a computer-readable recording medium, such as a hard disk, a flexible disk (FD), a CD-ROM, an MO, and a DVD, and can be executed by being read from the recording medium by the computer.

INDUSTRIAL APPLICABILITY

As described above, the service providing system and the service providing method according to the present invention are effective to provide a service on a network to a terminal, and in particular, suitable to provide a high-value-added Web service associated with various information related to a user as well as to cope with an ad hoc communication relationship.

REFERENCE SIGNS LIST

10 Service providing server
11 Session information database
12 Store information database
13 History information database
14 Certificate verification unit
15 Web session information issuing unit
16 Service providing unit
17 User information database
20 Session management server
21 call session information database
22 Service usage information database
23 SIP communication control unit
24 call session information verification unit
25 Certificate issuing unit
26 user ID association unit
30 Terminal
31 SIP communication unit
32 call session information collection unit
33 call session information transmission unit
34 Service use unit

The invention claimed is:

1. A service providing system for providing a service on a network to a plurality of terminals by a service providing server, comprising:
   a session management server different from the service providing server; and
   the service providing server, wherein
   the session management server includes
      circuitry configured to perform as
         an identification information issuing unit that, when receiving service selection information from each of the plurality of terminals, issues identification information to each of the plurality of terminals, the identification information identifying a respective terminal or a user of the respective terminal that sent the service selection information and the identification information further identifies a first communication established between the plurality of terminals outside of the service providing server; the identification information issuing unit further, for each of the plurality of terminals, instructs the respective terminal to access the service providing server corresponding to the service selection information, and transmits the identification information identifying the respective terminal or the user of the respective terminal and identifying the first communication established between the plurality of terminals outside of the service providing server to the respective terminal;

the service providing server includes
circuitry configured to perform as
a communication information collecting unit that receives from each of the plurality of terminals communication information that identifies the first communication established between the plurality of terminals;
an identification information collecting unit that receives from each of the plurality of terminals the identification information identifying the respective terminal or the user of the respective terminal transmitted by the session management server to each of the plurality of terminals issued by the identification information issuing unit combined with the communication information for each of the plurality of terminals;
an associating unit that identifies communication information pieces indicating the same communication from a plurality of communication information pieces received by the communication information collecting unit and associates services, which are provided to each of the plurality of terminals which establish the communication identified by the identified communication information pieces, with each other; and
a service providing unit that, when providing the services associated with each other by the associating unit to the plurality of terminals, identifies identification information pieces that identify the plurality of terminals or users of the plurality of terminals from a plurality of identification information pieces received by the identification information collecting unit, and controls service provision so that the services are provided in accordance with information stored in a storage unit in association with the identified identification information pieces.

2. The service providing system according to claim 1, wherein
the communication established between the plurality of terminals is communication established by SIP, and
the communication information collecting unit collects the communication information that identifies communication established between the plurality of terminals by the SIP.

3. The service providing system according to claim 1, wherein
the service providing server further includes
a storage unit that stores history information of services provided by the service providing unit into the storage unit in association with the identification information issued by the identification information issuing unit, and
the service providing unit controls service provision so that services are provided in accordance with the history information stored in the storage unit in association with the identified identification information pieces.

4. The service providing system according to claim 2, wherein
the service providing server further includes
a storage unit that stores history information of services provided by the service providing unit into the storage unit in association with the identification information issued by the identification information issuing unit, and
the service providing unit controls service provision so that services are provided in accordance with the history information stored in the storage unit in association with the identified identification information pieces.

5. The service providing system according to claim 1, wherein
the service providing server further includes
a user information storage unit that stores user-related information of a terminal, and
circuitry configured to perform as:
a user information associating unit that associates the identification information issued by the identification information issuing unit and the user-related information stored by the user information storage unit with each other, and the service providing unit controls service provision so that services are provided in accordance with the user-related information which is associated with the identified identification information pieces by the user information associating unit.

6. The service providing system according to claim 2, wherein
the service providing server further includes
a user information storage unit that stores user-related information of a terminal, and
circuitry configured to perform as:
a user information associating unit that associates the identification information issued by the identification information issuing unit and the user-related information stored by the user information storage unit with each other, and the service providing unit controls service provision so that services are provided in accordance with the user-related information which is associated with the identified identification information pieces by the user information associating unit.

7. The service providing system according to claim 1, wherein
the session management server further includes
circuitry configured to perform as:
a user identification information associating unit that associates the identification information issued by the identification information issuing unit and user identification information that identifies a user of the terminal with each other, and
a user identification information transmission unit that transmits the user identification information associated by the user identification information associating unit to the service providing server,
the service providing server further includes
a user information storage unit that stores user identification information and user-related information identified by the user identification information in association with each other, the identification information collecting unit collects the user identification information transmitted by the user identification information transmission unit as information combined with the communication information for each terminal, and the service providing unit identifies user identification information pieces that identify users of the terminals from a plurality of user identification information pieces received by the identification information collecting unit, and controls service provision so that services are provided in accordance with the user-related information stored in the user information storage unit in association with the identified user identification information pieces.

8. The service providing system according to claim 2, wherein the session management server further includes
circuitry configured to perform as:
a user identification information associating unit that associates the identification information issued by the identification information issuing unit and user identification information that identifies a user of the terminal with each other, and
a user identification information transmission unit that transmits the user identification information associated by the user identification information associating unit to the service providing server, the service providing server further includes a user information storage unit that stores user identification information and user-related information identified by the user identification information in association with each other,
the identification information collecting unit collects the user identification information transmitted by the user identification information transmission unit as information combined with the communication information for each terminal, and
the service providing unit identifies user identification information pieces that identify users of the terminals from a plurality of user identification information pieces received by the identification information collecting unit, and controls service provision so that services are provided in accordance with the user-related information stored in the user information storage unit in association with the identified user identification information pieces.

9. The service providing system according to claim 3, wherein
the identification information issuing unit issues different identification information for each combination of the respective terminal and the service providing server.

10. The service providing system according to claim 3, wherein
the identification information issuing unit issues identification information having a format that can be verified, and
the service providing server further includes
circuitry configured to perform as:
an identification information verifying unit that, when the identification information collecting unit collects identification information having a format that can be verified, verifies a fact related to the identification information.

11. A service providing method for providing a service on a network to a plurality of terminals by a service providing server, comprising:

issuing, from a session management server different from the service providing server, when receiving service selection information from each of the plurality of terminals, identification information to each of the plurality of terminals, the identification information identifying a respective terminal or a user of the respective terminal that sent the service selection information and the identification information further identifies a first communication established between the plurality of terminals outside of the service providing server;

for each of the plurality of terminals, instructing the respective terminal to access the service providing server corresponding to the service selection information, and transmitting the identification information identifying the respective terminal or the user of the respective terminal and identifying the first communication established between the plurality of terminals outside of the service providing server to the respective terminal;

receiving, in the service providing server, from each of the plurality of terminals, communication information that identifies the first communication established between the plurality of terminals;

receiving, in the service providing server, from each of the plurality of terminals, identification information identifying the respective terminal or the user of the respective terminal combined with the communication information for each of the plurality of terminals;

identifying communication information pieces indicating the same communication from a plurality of the received communication information pieces and associating services, which are provided to the plurality of terminals which establish the communication identified by the identified communication information pieces, with each other; and identifying, when providing the services associated with each other to the plurality of terminals, identification information pieces that identify the plurality of terminals or users of the plurality of terminals from a plurality of the received identification information pieces, and controlling service provision so that the services are provided in accordance with information stored in a storage unit in association with the identified identification information pieces.

12. A service providing system for providing a service on a network to a plurality of client side systems by a service providing server, comprising:

a session management server different from the service providing server; and the service providing server, wherein
the session management server includes
circuitry configured to perform as
an identification information issuing unit that, when receiving service selection information from each of the plurality of client side systems, issues identification information to each of the plurality of client side systems, the identification information identifying a respective client-side system or a user of the respective client-side system that sent the service selection information and the identification information further identifies a first communication established between the plurality of client-side systems outside of the service providing server; the identification information issuing unit further, for each of the plurality of client side systems, instructs the respective client-side system to access the service providing server corresponding to the service selection information, and transmits the identification information identifying the respective client-side system or the user of the respective client-side system and identifying the first communication established between the plurality of client-side systems outside of the service providing server to the respective client-side system, the service providing server includes
circuitry configured to perform as
a communication information collecting unit that receives from each of the plurality of client-side systems communication information that identifies the first communication established between the plurality of client-side systems;
an identification information collecting unit that receives from each of the plurality of client-side systems identification information identifying the respective client-side system or the user of the respective client-side system issued by the identification information issuing unit combined with the communication information for each of the plurality of client-side systems;
an associating unit that identifies communication information pieces indicating the same communication from a plurality of communication information pieces received by the communication information collecting unit and associates services, which are provided to each of the plurality of client-side systems which establish the communication identified by the identified communication information pieces, with each other; and
a service providing unit that, when providing the services associated with each other by the associating unit to plurality of the client-side systems, identifies identification information pieces that identify the plurality of client-side systems or users of the plurality of client-side systems from a plurality of identification information pieces received by the identification information collecting unit, and controls service provision so that the services are provided in accordance with information stored in a storage unit in association with the identified identification information pieces.

13. A service providing system for providing a service on a network to a plurality of terminals, comprising:
a session management server different from a service providing server; and
the service providing server, wherein
the session management server includes
circuitry configured to perform as
an identification information issuing unit that, when receiving service selection information from each of the plurality of terminals, issues identification information to each of the plurality of terminals, the identification information identifying a respective terminal or a user of the respective terminal that sent the service selection information and the identification information further identifies a first communication established between the service providing server and the respective terminal; the identification information issuing unit further, for each of the plurality of terminals, instructs the respective terminal to access the service providing server corresponding to the service selection information, and transmits the identification information identifying the respective terminal or the user of the respective terminal and identifying the first communication established between the respective terminal and the service providing server to the respective terminal, and the service providing server includes
circuitry configured to perform as
a communication information collecting unit that receives from the respective terminal communication information that identifies the first communication established between the service providing server and the respective terminal, an identification information collecting unit that receives from each of the plurality of terminals identification information identifying the respective terminal or the user of the respective terminal issued by the identification information issuing unit combined with the communication information for the plurality of terminals, and
a service providing unit that identifies communication information indicating communication established between the service providing server and the respective terminal from a plurality of communication information pieces received by the communication information collecting unit, when providing a service to the respective terminal that establishes the communication identified by the identified communication information, identifies identification information pieces that identify the respective terminal or the user of the respective terminal from a plurality of identification information pieces received by the identification information collecting unit, and controls service provision so that the services are provided in accordance with information stored in a storage unit in association with the identified identification information pieces,
wherein the respective terminal is not registered in the service providing server as a recipient of the service in advance of providing the service to the respective terminal.

14. A non-transitory computer readable storage medium having stored therein a service providing program causing a computer to execute a process comprising:
issuing, from a session management server different from a service providing server, when receiving service selection information from each of a plurality of terminals, identification information to each of the plurality of terminals, the identification information identifying a respective terminal or a user of the respective terminal that sent the service selection information and the identification information further identifies a first communication established between the plurality of terminals outside of the service providing server;
for each of the plurality of terminals, instructing the respective terminal to access the service providing server corresponding to the service selection information, and transmitting the identification information identifying the respective terminal or the user of the respective terminal and identifying the first communication established between the plurality of terminals outside of the service providing server to the respective terminal;
receiving, in the service providing server, from each of the plurality of terminals, communication information that identifies the first communication established between the plurality of terminals;
receiving, in the service providing server, from each of the plurality of terminals, identification information identifying the respective terminal or the user of the respective terminal combined with the communication information for each of the plurality of terminals;

identifying communication information pieces indicating the same communication from a plurality of the received communication information pieces and associating services, which are provided to the plurality of terminals which establish the communication identified by the identified communication information pieces, with each other; and identifying, when providing the services associated with each other to the plurality of terminals, identification information pieces that identify the plurality of terminals or users of the plurality of terminals from a plurality of the received identification information pieces, and controlling service provision so that the services are provided in accordance with information stored in a storage unit in association with the identified identification information pieces.

15. A non-transitory computer readable storage medium having stored therein a service providing program causing a computer to execute a process comprising:

issuing, from a session management server different from a service providing server, when receiving service selection information from each of a plurality of client-side systems, identification information to each of the plurality of client-side systems, the identification information identifying a respective client-side system or a user of the respective client-side system that sent the service selection information and the identification information further identifies a first communication established between the plurality of client-side systems outside of the service providing server;

for each of the plurality of client side systems, instructing the respective client-side system to access the service providing server corresponding to the service selection information, and transmitting the identification information identifying the respective client-side system or the user of the respective client-side system and identifying the first communication established between the plurality of client-side systems outside of the service providing server to respective the client-side system;

receiving, in the service providing server, from each of the plurality client-side systems, communication information that identifies the first communication established between the plurality of client-side systems;

receiving, in the service providing server, from each of the plurality of client-side systems, identification information identifying the respective client-side system or the user of the respective client-side system combined with the communication information for each of the plurality of client-side systems;

identifying communication information pieces indicating the same communication from a plurality of the received communication information pieces and associating services, which are provided to each of the plurality of client-side systems which establish the communication identified by the identified communication information pieces, with each other; and identifying, when providing the services associated with each other to the plurality of client-side systems, identification information pieces that identify the plurality of client-side systems or users of the plurality of client-side systems from a plurality of the received identification information pieces, and controlling service provision so that the services are provided in accordance with information stored in a storage unit in association with the identified identification information pieces.

16. A non-transitory computer readable storage medium having stored therein a service providing program causing a computer to execute a process comprising:

issuing, from a session management server different from a service providing server, when receiving service selection information from each of a plurality of terminals, identification information to each of the plurality of terminals, the identification information identifying a respective terminal or a user of the respective terminal that sent the service selection information and the identification information further identifies a first communication established between the service providing server and the respective terminal;

for each of the plurality of terminals, instructing the respective terminal to access a service providing server corresponding to the service selection information, and transmitting the identification information identifying the respective terminal or the user of the respective terminal and identifying the first communication established between the respective terminal and the service providing server to the respective terminal;

receiving, in the service providing server, communication information that identifies the first communication established between the service providing server and the respective terminal, receiving, in the service providing server, from each of the plurality of terminals, identification information identifying the respective terminal or the user of the respective terminal combined with the communication information for each of the plurality of terminals;

identifying communication information indicating communication established between the service providing server and the respective terminal from a plurality of the received communication information pieces, when providing a service to the respective terminal that establishes the communication identified by the identified communication information, identifying identification information pieces that identify the respective terminal or the user of the respective terminal from a plurality of the received identification information pieces, and controlling service provision so that the services are provided in accordance with information stored in a storage unit in association with the identified identification information pieces, wherein the respective terminal is not registered in the service providing server as a recipient of the service in advance of providing the service to the respective terminal.

* * * * *